(12) United States Patent
Egendorf et al.

(10) Patent No.: US 9,348,911 B2
(45) Date of Patent: May 24, 2016

(54) METHOD FOR SEARCHING FROM A PLURALITY OF DATA SOURCES

(75) Inventors: Andrew Egendorf, Lincoln, MA (US);
Norton Greenfeld, Wayland, MA (US);
Eugene Pettinelli, Sudbury, MA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 409 days.

(21) Appl. No.: 10/348,610

(22) Filed: Jan. 21, 2003

(65) Prior Publication Data
US 2003/0177111 A1   Sep. 18, 2003

Related U.S. Application Data

(63) Continuation of application No. 09/441,270, filed on Nov. 16, 1999, now abandoned.

(51) Int. Cl.
*G06F 17/30*   (2006.01)

(52) U.S. Cl.
CPC ................. *G06F 17/30864* (2013.01)

(58) Field of Classification Search
USPC ................ 707/3–5, 10, 100–101, 706, 751
See application file for complete search history.

(56) References Cited

U.S. PATENT DOCUMENTS

| | | |
|---|---|---|
| 4,879,648 A | 11/1989 | Cochran et al. |
| 5,206,949 A | 4/1993 | Cochran et al. |
| 5,375,235 A | 12/1994 | Berry et al. |
| 5,444,823 A | 8/1995 | Nguyen |
| 5,577,241 A | 11/1996 | Spencer |

(Continued)

OTHER PUBLICATIONS

Stanford University Digital Library Project, Quarterly and Annual Reports, Aug. 1, 1995 through Final Report Sep. 1, 1998.

(Continued)

*Primary Examiner* — Khanh Pham
(74) *Attorney, Agent, or Firm* — Guntin & Gust, PLC; Joseph Hrutka

(57) ABSTRACT

A method of searching for information on a computer information network comprises providing a searchbase comprising a plurality of descriptive packets, wherein each packet is associated with one of a plurality of information sources published on a computer information network and includes a query language and template usable therewith, a sending protocol usable therewith and a receiving protocol usable therewith. A search request is received over the computer information network from a user for retrieving information from the plurality of information sources in accordance with given search criteria. The search request is transformed into an inquiry capable of searching the searchbase and the searchbase is searched with the inquiry to identify any of the plurality of information sources which potentially meet the given search criteria. The search request is transformed into queries for the identified information sources, wherein each query is in accordance with the query language and query template in the descriptive packet for the corresponding information source and the queries are sent over the computer information network to the identified information sources in accordance with the sending protocol in the descriptive packet for the corresponding information source. Information is received over the computer information network from the identified information sources in response to the queries in accordance with the receiving protocol in the descriptive packet for the corresponding information source.

13 Claims, 25 Drawing Sheets

(56) References Cited

U.S. PATENT DOCUMENTS

| | | | |
|---|---|---|---|
| 5,623,652 A | 4/1997 | Vora et al. | |
| 5,634,051 A | 5/1997 | Thomson | |
| 5,640,553 A | 6/1997 | Schultz | |
| 5,694,546 A | 12/1997 | Reisman | |
| 5,694,593 A | 12/1997 | Baclawski | |
| 5,701,469 A * | 12/1997 | Brandli et al. | 707/102 |
| 5,715,444 A | 2/1998 | Danish et al. | |
| 5,717,914 A | 2/1998 | Husick et al. | |
| 5,720,001 A | 2/1998 | Nguyen | |
| 5,737,734 A | 4/1998 | Schultz | |
| 5,742,816 A | 4/1998 | Barr et al. | |
| 5,745,889 A | 4/1998 | Burrows | |
| 5,748,954 A | 5/1998 | Mauldin | |
| 5,751,956 A | 5/1998 | Kirsch | |
| 5,751,961 A | 5/1998 | Smyk | |
| 5,761,499 A | 6/1998 | Sonderegger | |
| 5,768,581 A | 6/1998 | Cochran | |
| 5,778,367 A | 7/1998 | Wesinger, Jr. et al. | |
| 5,778,368 A | 7/1998 | Hogan et al. | |
| 5,809,499 A | 9/1998 | Wong et al. | |
| 5,819,273 A | 10/1998 | Vora et al. | |
| 5,831,631 A | 11/1998 | Light et al. | |
| 5,842,206 A | 11/1998 | Sotomayor | |
| 5,845,278 A | 12/1998 | Kirsch et al. | |
| 5,859,972 A | 1/1999 | Subramaniam et al. | 709/203 |
| 5,870,739 A | 2/1999 | Davis, III et al. | |
| 5,873,076 A | 2/1999 | Barr et al. | |
| 5,873,080 A | 2/1999 | Coden et al. | |
| 5,884,305 A | 3/1999 | Kleinberg et al. | |
| 5,895,461 A | 4/1999 | De La Huerga et al. | |
| 5,920,856 A | 7/1999 | Syeda-Mahmood | |
| 5,924,090 A | 7/1999 | Krellenstein | |
| 5,926,808 A | 7/1999 | Evans et al. | |
| 5,933,822 A | 8/1999 | Braden-Harder et al. | |
| 5,937,422 A | 8/1999 | Nelson et al. | |
| 5,974,409 A | 10/1999 | Sanu et al. | |
| 5,983,216 A | 11/1999 | Kirsch et al. | |
| 5,983,221 A | 11/1999 | Christy | |
| 5,987,454 A | 11/1999 | Hobbs | 704/4 |
| 5,987,457 A | 11/1999 | Ballard | |
| 6,005,565 A | 12/1999 | Legall et al. | |
| 6,006,217 A | 12/1999 | Lumsden | |
| 6,009,422 A | 12/1999 | Ciccarelli | |
| 6,012,055 A | 1/2000 | Campbell et al. | |
| 6,014,659 A | 1/2000 | Wilkinson, III et al. | |
| 6,014,665 A | 1/2000 | Culliss | |
| 6,026,429 A | 2/2000 | Jones et al. | 709/201 |
| 6,085,186 A | 7/2000 | Christianson et al. | 707/3 |
| 6,292,796 B1 * | 9/2001 | Drucker et al. | 707/5 |
| 6,336,116 B1 | 1/2002 | Brown et al. | 707/10 |
| 2003/0110161 A1 * | 6/2003 | Schneider | 707/3 |

OTHER PUBLICATIONS

"Beyond Document Similarity: Understanding Value-Based Search and Browsing Technologies", Stanford University, undated.
"Mind Your Vocabulary: Query Mapping Across Heterogeneous Information Sources" Stanford University, undated.
"Search Engine Features Chart", *Search Engine Watch*; www.searchingenginewatch.com; chart as of Aug. 4, 1998.
"The Future of Search Engines" *The Industry Standard*, Sep. 25, 1998.
"How Search Engines Work", *Search Engine Watch*; www.searchenginewatch.com; printed Oct. 13, 1998.
"The Major Search Engines", *Search Engine Watch*; www.searchenginewatch.com; printed Oct. 13, 1998.
"Search Engines and Dynamic Pages", *Search Engine Watch*; www.searchenginewatch.com; printed Oct. 13, 1998.
"Specialty Search Engines", *Search Engine Watch*; www.searchenginewatch.com; printed Oct. 16, 1999.
"Call Your Agent for Online Shopping", *Information Week*, Dec. 7, 1998.
Search Engine Update #63; www.searchenginewatch.com; Oct. 18, 1999.
Search Engine Update #64 (in 2 parts); www.searchenginewatch.com; Nov. 2, 1999.
"KPMG Awards InfoGlide Similarity Search Engine Best Product of the Year", *NEWSdesk Press Release*, Nov. 2, 1999.
mySimon inc. site; www.mysimon.com [/index & /about_mysimon]; 4 pages; printed Nov. 3, 1999.
HP Instant Delivery site; www.instant-delivery.com [/Home & /Publish]; 15 pages; printed Nov. 3, 1999.
Office Action from parent U.S. Appl. No. 09/441,270, dated Jul. 31, 2002.

* cited by examiner

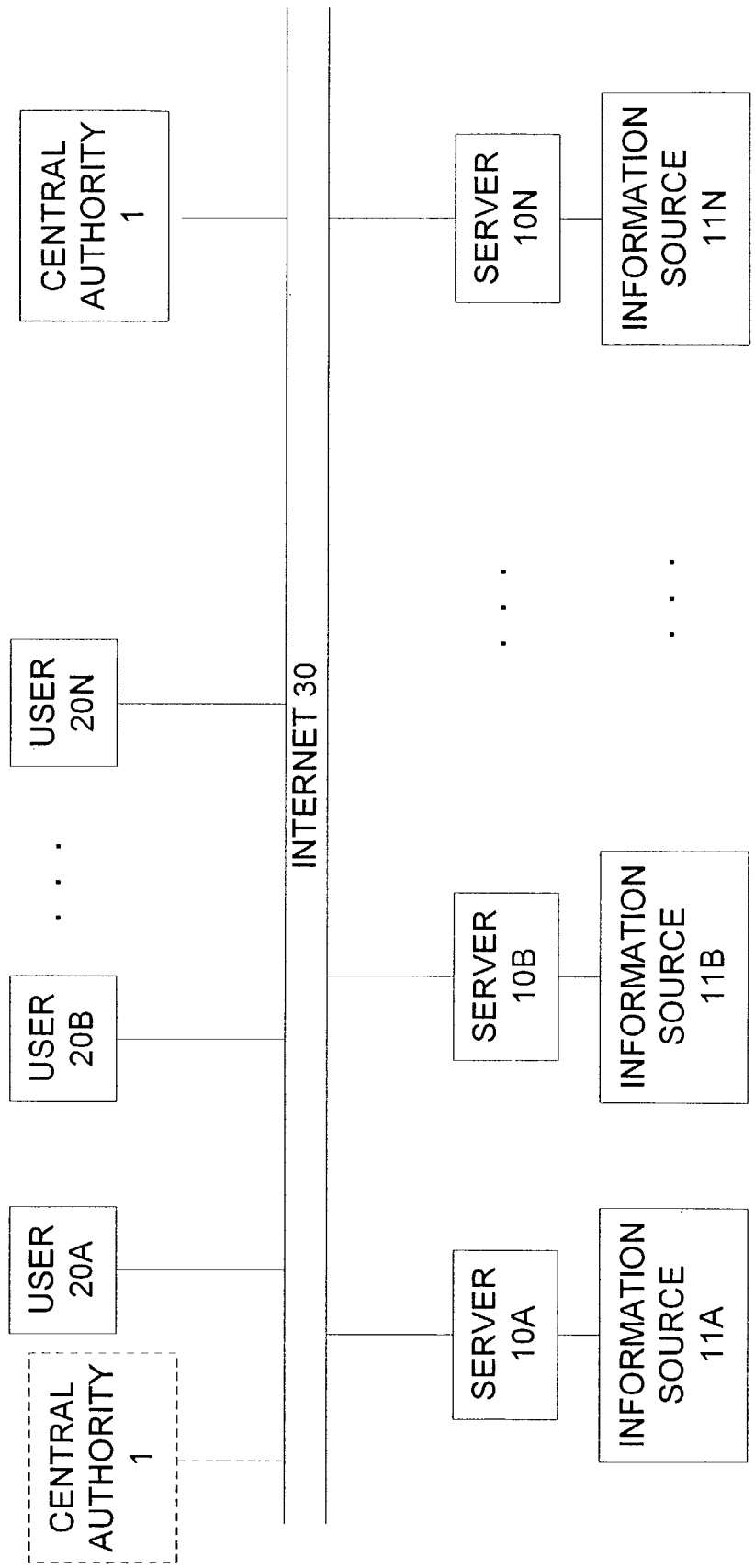

| Categories | Vendor Associated With Information Source |
|---|---|
| apparel | Alpha |
| apparel-shoe | Beta |ает

```
Categories                                    Vendor Associated
                                              With Information
                                              Source apparel ................................. Alpha
apparel-shoe ............................. Beta
apparel-shoe-boy
apparel-shoe-girl
apparel-shoe-men
apparel-shoe-women
apparel-shoe-athletic .................... Gamma
apparel-shoe-athletic-hiking
apparel-shoe-athletic-riding
apparel-shoe-athletic-running
apparel-shoe-athletic-tennis
apparel-shoe-casual
apparel-shoe-dress
apparel-shoe-elevator
apparel-shoe-formal
apparel-shoe-formal-antique
                  •
                  •
                  •
apparel-shoe-sandal
apparel-shoe-slipper
apparel-shoe-slipper-ballet
apparel-shoe-slipper-bedroom
apparel-shoe-slipper-glass
apparel-sleepwear
                  •
                  •
                  •
books
```

FIG. 3A

| Categories | Vendor(s) Associated With Information Source |
|---|---|
| apparel | Alpha, Beta, Gamma |
| apparel-shoe | Alpha, Beta, Gamma |
| apparel-shoe-boy | Alpha, Beta |
| apparel-shoe-girl | Alpha, Beta |
| apparel-shoe-men | Alpha, Beta |
| apparel-shoe-women | Alpha, Beta |
| apparel-shoe-athletic | Alpha, Beta, Gamma |
| apparel-shoe-athletic-hiking | Alpha, Beta, Gamma |
| apparel-shoe-athletic-riding | Alpha, Beta, Gamma |
| apparel-shoe-athletic-running | Alpha, Beta, Gamma |
| apparel-shoe-athletic-tennis | Alpha, Beta, Gamma |
| apparel-shoe-casual | Alpha, Beta |
| apparel-shoe-dress | Alpha, Beta |
| apparel-shoe-elevator | Alpha, Beta |
| apparel-shoe-formal | Alpha, Beta |
| apparel shoe-formal-antique | Alpha, Beta |
| ... | |
| apparel-shoe-sandal | Alpha, Beta |
| apparel-shoe-slipper | Alpha, Beta |
| apparel-shoe-slipper-ballet | Alpha, Beta |
| apparel-shoe-slipper-bedroom | Alpha, Beta |
| apparel-shoe-slipper-glass | Alpha, Beta |
| apparel-sleepwear | Alpha |
| ... | |
| books | |

FIG. 3B apparel
    shoe
        boy, girl, men, women
        athletic, casual, dress, elevator, formal, work
        Gucci, Nike, Nine West, Reebok
        boot, high-heel, loafer, sandal, slipper
            Expansions under athletic, formal, and slipper are:
            athletic
                hiking, riding, running, tennis
            formal
                antique, costume, dress, modern
            slipper
                ballet, bedroom, glass
    sleepwear
                    •
                    •
                    •
    books

FIG. 11A

|    | Vendor | Description | Price | Other Attributes | Product ID |
|----|--------|-------------|-------|------------------|------------|
| 1  | alpha  | boot        | $120  | grey             | A0001, grey boots |
| 2  | alpha  | men's dress | $150  | black            | A0002, wonderful dress shoe in black |
| 3  | alpha  | men's dress | $100  | brown            | A0003, men's dress shoe in brown |
| 4  | alpha  | women's loafer | $60 | burgandy        | A0004, women's loafer in burgandy |
| 5  | alpha  | women's slipper | $30 | white          | A0005, women's slipper in white |
| 6  | beta   | dress       | $75   | black, sizes 9-12 | B0001, dress shoes, various sizes, black |
| 7  | beta   | dress       | $75   | brown, sizes 7-12 | B0002, dress shoes, various sizes, brown |
| 8  | beta   | men's formal | $95  | black, sizes 7-12 | B0003, formal shoe for men |
| 9  | beta   | running     | $40   | white            | B0004, white running shoe |
| 10 | beta   | men's tennis | $35  | white            | B0005, white tennis shoe for men |
| 11 | gamma  | riding      | $120  |                  | C0001, riding shoes |
| 12 | gamma  | running     | $35   | Nike             | C0002, Nike running shoe |
| 13 | gamma  | running     | $40   | Reebok           | C0003, Reebok running shoe |
| 14 | gamma  | tennis      | $45   |                  | C0004, generic tennis shoe |
| 15 | gamma  | waders      | $140  |                  | C0005, specialty shoe/boot: waders |

Add InfoSource

Add Your Site As An Information Source

Submitting this form will add you to our Searchbase™ and allow users to search your up-to-the-minute database.

| | |
|---:|---|
| Name: | |
| Company: | |
| Address: | |
| Phone: | |
| Fax: | |
| E-mail: | |

⎬ 1201

1202 { What queries do you want sent to you?
☐ Send me every query.
☐ Do not send me any queries EXCEPT those about: (choose the categories for queries) (click "sub-menus" to see the sub-menus of selected categories)
(For descriptions and other help, click here)

1203 {
| ☐ Apparel | ☐ Flowers & Gifts | ☐ Movies & Video | ☐ Toys & Games |
|---|---|---|---|
| ☐ Books | ☐ Food & Drink | ☐ Music | ☐ Travel |
| ☐ Computers | ☐ Health & Beauty | ☐ Office | more categories |
| ☐ Electronics | ☐ Home & Garden | ☐ Sports & Fitness | sub-menus |

We need to know how to formulate a query for you, how to communicate with you, and how to understand your responses.

Choose One:
☐ I'll tell you now by filling in A, B, C, D, E, and F now.
☐ I'll tell you later. I'll fill in A, B, C, and D now so you can contact me. ⎬ 1210
(click here for instructions)

The following inputs provide methods to query your site, to communicate, and to extract information from your response. For each set, choose the response corresponding to your site. (click here for further details.)

A. Language used to query your site:

| ☐ C/C++ | ☐ MQSeries | ☐ URL |
|---|---|---|
| ☐ Cobol | ☐ Pascal | ☐ VBScript |
| ☐ Corba | ☐ Python | ☐ XML |
| ☐ Java | ☐ TCL | more |

⎬ 1204

B. Template of Query Language: [_____] ~ 1205

C. Protocol used for sending to you: ☐ HTTP ☐ HTTPS ☐ FTP ☐ TCP/IP ☐ e-mail more ~ 1206

D. Protocol used for receiving from you: ☐ HTTP ☐ HTTPS ☐ FTP ☐ TCP/IP ☐ e-mail more ~ 1207

E. Language used by your site to respond:

| ☐ C/C++ | ☐ Pascal | ☐ VBScript |
|---|---|---|
| ☐ CSV | ☐ Perl | ☐ VBA |
| ☐ Grep | ☐ Python | ☐ XML |
| ☐ Java | ☐ TCL | more |

⎬ 1208

F. Template of response language: [_____] ~ 1209

[Submit]  *Thank you.*  [Clear]

Add InfoSource Sub-Categories

This form shows you the sub-categories of the ones you selected on the previous page. Choose the categories for queries. (click "sub-menus" to see the sub-menus of selected categories)
(for descriptions and other help, click here)

Apparel:
- ☐ Accessories  ☐ Dresses     ☐ Formalwear  ☐ Jewelry
- ☐ Outerwear    ☐ Pants       ☐ Shoes       ☐ Sleepwear
- ☐ Specialty    ☐ Sportswear  ☐ Suits       ☐ Underwear
- ☐ Uniforms     ☐ Watches     ☐ Wedding     ☐ Work
                               more           sub-menus

} 1211

[Submit]   *Thank you.*   [Clear]

FIG. 12B

Add InfoSource Sub-Categories

This form shows you the sub-categories of the ones you selected on the previous page. Choose the categories for queries. (click "sub-menus" to see the sub-menus of selected categories)
(for descriptions and other help, click here)

Shoes: ☐ boy ☐ girl ☐ men ☐ women
☐ athletic ☐ casual ☐ dress ☐ elevator
☐ formal ☐ work
☐ boot ☐ high heel ☐ loafer ☐ sandal
☐ slipper
☐ brand names
☐ price ranges more    sub-menus

} 1212

| Submit | *Thank you.* | Clear |

Add InfoSource

Add Your Site As An Information Source

Submitting this form will add you to our Searchbase™ and allow users to search your up-to-the-minute database.

| | |
|---|---|
| Name: | Andy Alpha |
| Company: | Alpha |
| Address: | 123 Main St. |
| Phone: | (123) 456-7890 |
| Fax: | (123) 456-7891 |
| E-mail: | andy@alpha.com |

What queries do you want sent to you?
- ☐ Send me every query.
- ☑ Do not send me any queries EXCEPT those about: (choose the categories for queries) (click "sub-menus" to see the sub-menus of selected categories)
  (For descriptions and other help, click here)

| | | | |
|---|---|---|---|
| ☑ Apparel | ☐ Flowers & Gifts | ☐ Movies & Video | ☐ Toys & Games |
| ☐ Books | ☐ Food & Drink | ☐ Music | ☐ Travel |
| ☐ Computers | ☐ Health & Beauty | ☐ Office | more categories |
| ☐ Electronics | ☐ Home & Garden | ☐ Sports & Fitness | sub-menus |

We need to know how to formulate a query for you, how to communicate with you, and how to understand your responses.

Choose One:
- ☑ I'll tell you now by filling in A, B, C, D, E, and F now.
- ☐ I'll tell you later. I'll fill in A, B, and D now so you can contact me.
  (click here for instructions)

The following inputs provide methods to query your site, to communicate, and to extract information from your response. For each set, choose the response corresponding to your site. (click here for further details.)

A. Language used to query your site:

| | | |
|---|---|---|
| ☐ C/C++ | ☐ MQSeries | ☑ URL |
| ☐ Cobol | ☐ Pascal | ☐ VBScript |
| ☐ Corba | ☐ Python | ☐ XML |
| ☐ Java | ☐ TCL | more |

B. Template of Query Language: `http://www.alpha.com/bin/getproduct?type=<type>&color=<co`

C. Protocol used for sending to you: ☑ HTTP ☐ HTTPS ☐ FTP ☐ TCP/IP ☐ e-mail more

D. Protocol used for receiving from you: ☑ HTTP ☐ HTTPS ☐ FTP ☐ TCP/IP ☐ e-mail more

E. Language used by your site to respond:

| | | |
|---|---|---|
| ☐ C/C++ | ☐ Pascal | ☐ VBScript |
| ☐ CSV | ☐ Perl | ☐ VBA |
| ☑ Grep | ☐ Python | ☐ XML |
| ☐ Java | ☐ TCL | more |

F. Template of response langauge: `SKU:\t{A-Z}*\nType:\t{A-Z}*\nColor:\t{A-Z}*\nPrice:${0-9}`

[Submit]  *Thank you.*  [Clear]

FIG. 14A

Add InfoSource

Add Your Site As An Information Source

Submitting this form will add you to our Searchbase™ and allow users to search your up-to-the-minute database.

Name: Betty Beta
Company: Beta
Address: 101 San Rafael
Phone: 415-514-4321
Fax: 415-514-4322
E-mail: betty@beta.com

What queries do you want sent to you?
- ☐ Send me every query.
- ☑ Do not send me any queries EXCEPT those about: (choose the categories for queries) (click "sub-menus" to see the sub-menus of selected categories)
(For descriptions and other help, click here)

| ☐ Apparel | ☐ Flowers & Gifts | ☐ Movies & Video | ☐ Toys & Games |
|---|---|---|---|
| ☐ Books | ☐ Food & Drink | ☐ Music | ☐ Travel |
| ☐ Computers | ☐ Health & Beauty | ☐ Office | more categories |
| ☐ Electronics | ☐ Home & Garden | ☐ Sports & Fitness | sub-menus |

We need to know how to formulate a query for you, how to communicate with you, and how to understand your responses.

Choose One:
- ☑ I'll tell you now by filling in A, B, C, D, E, and F now.
- ☐ I'll tell you later. I'll fill in A, B, C, and D now so you can contact me.
(click here for instructions)

The following inputs provide methods to query your site, to communicate, and to extract information from your response. For each set, choose the response corresponding to your site. (click here for further details.)

A. Language used to query your site:

| ☑ C/C++ | ☐ MQSeries | ☐ URL |
|---|---|---|
| ☐ Cobol | ☐ Pascal | ☐ VBScript |
| ☐ Corba | ☐ Python | ☐ XML |
| ☐ Java | ☐ TCL | more |

B. Template of Query Language: `call: <type>,<price>,<color>; code: #include <stdio.h>`

C. Protocol used for sending to you: ☐ HTTP ☐ HTTPS ☐ FTP ☑ TCP/IP ☐ e-mail more

D. Protocol used for receiving from you: ☐ HTTP ☐ HTTPS ☐ FTP ☑ TCP/IP ☐ e-mail more

E. Language used by your site to respond:

| ☐ C/C++ | ☐ Pascal | ☐ VBScript |
|---|---|---|
| ☑ CSV | ☐ Perl | ☐ VBA |
| ☐ Grep | ☐ Python | ☐ XML |
| ☐ Java | ☐ TCL | more |

F. Template of response langauge: `<id>,<description>,<color>,<price>`

[Submit]  *Thank you.*  [Clear]

Add InfoSource Sub-Categories

[BusinessFashions] This form shows you the sub-categories of the ones you selected on the previous page. Choose the
[About Us] categories for queries. (click "sub-menus" to see the sub-menus of selected categories)
[Add InfoSource] (for descriptions and other help, click here)

Apparel: ☐ Accessories  ☐ Dresses     ☐ Formalwear  ☐ Jewelry
           ☐ Outerwear   ☐ Pants       ☑ Shoes       ☐ Sleepwear
           ☐ Specialty   ☐ Sportswear  ☐ Suits       ☐ Underwear
           ☐ Uniforms    ☐ Watches     ☐ Wedding     ☐ Work
                                        more          sub-menus

[Submit]   *Thank you.*   [Clear]

Add InfoSource

Add Your Site As An Information Source

Submitting this form will add you to our Searchbase™ and allow users to search your up-to-the-minute database.

Name: George Gamma
Company: Gamma
Address: 5A Memorial Drive
Phone: (617) 789-3456
Fax: (617) 789-3457
E-mail: george@gamma.com

What queries do you want sent to you?
- ☐ Send me every query.
- ☑ Do not send me any queries EXCEPT those about: (choose the categories for queries) (click "sub-menus" to see the sub-menus of selected categories)
(For descriptions and other help, click here)

| ☐ Apparel | ☐ Flowers & Gifts | ☐ Movies & Video | ☐ Toys & Games |
|---|---|---|---|
| ☐ Books | ☐ Food & Drink | ☐ Music | ☐ Travel |
| ☐ Computers | ☐ Health & Beauty | ☐ Office | more categories |
| ☐ Electronics | ☐ Home & Garden | ☐ Sports & Fitness | sub-menus |

We need to know how to formulate a query for you, how to communicate with you, and how to understand your responses.

Choose One:
- ☑ I'll tell you now by filling in A, B, C, D, E, and F now.
- ☐ I'll tell you later. I'll fill in A, B, C, and D now so you can contact me.
(click here for instructions)

The following inputs provide methods to query your site, to communicate, and to extract information from your response. For each set, choose the response corresponding to your site. (click here for further details.)

A. Language used to query your site:

| ☐ C/C++ | ☐ MQSeries | ☐ URL |
|---|---|---|
| ☐ Cobol | ☐ Pascal | ☐ VBScript |
| ☐ Corba | ☐ Python | ☐ XML |
| ☐ Java | ☐ TCL | more |

B. Template of Query Language: `http://www.gamma.com/bin/getshoes?t=<type>&c=<color>&p=<p`

C. Protocol used for sending to you: ☑ HTTP ☐ HTTPS ☐ FTP ☐ TCP/IP ☐ e-mail more

D. Protocol used for receiving from you: ☑ HTTP ☐ HTTPS ☐ FTP ☐ TCP/IP ☐ e-mail more

E. Language used by your site to respond:

| ☐ C/C++ | ☐ Pascal | ☐ VBScript |
|---|---|---|
| ☑ CSV | ☐ Perl | ☐ VBA |
| ☐ Grep | ☐ Python | ☐ XML |
| ☐ Java | ☐ TCL | more |

F. Template of response langauge: `<id>,<price>,<color>,<description>`

[Submit] *Thank you.* [Clear]

Add InfoSource Sub-Categories

This form shows you the sub-categories of the ones you selected on the previous page. Choose the categories for queries. (click "sub-menus" to see the sub-menus of selected categories)
(for descriptions and other help, click here)

Apparel:
- ☐ Accessories  ☐ Dresses     ☐ Formalwear  ☐ Jewelry
- ☐ Outerwear    ☐ Pants       ☐ Shoes       ☐ Sleepwear
- ☐ Specialty    ☐ Sportswear  ☐ Suits       ☐ Underwear
- ☐ Uniforms     ☐ Watches     ☐ Wedding     ☐ Work more    sub-menus

[Submit]   *Thank you.*   [Clear]

FIG. 15B

Add InfoSource Sub-Categories

This form shows you the sub-categories of the ones you selected on the previous page. Choose the categories for queries. (click "sub-menus" to see the sub-menus of selected categories)
(for descriptions and other help, click here)

Shoes:
- ☐ boy ☐ girl ☐ men ☐ women
- ☑ athletic ☐ casual ☐ dress ☐ elevator
- ☐ formal ☐ work
- ☐ boot ☐ high heel ☐ loafer ☐ sandal
- ☐ slipper
- ☐ brand names
- ☐ price ranges more     sub-menus

[Submit]    *Thank you.*    [Clear]

Add InfoSource

Add Your Site As An Information Source

Submitting this form will add you to our Searchbase™ and allow users to search your up-to-the-minute database.

Name: Denise Delta

Company: Delta

Address: 1 Broadway

Phone: 617-716-9876

Fax: 617-716-9875

E-mail: denise@delta.com

What queries do you want sent to you?
- ☑ Send me every query.
- ☐ Do not send me any queries EXCEPT those about: (choose the categories for queries) (click "sub-menus" to see the sub-menus of selected categories)

(For descriptions and other help, click here)

| ☐ Apparel | ☐ Flowers & Gifts | ☐ Movies & Video | ☐ Toys & Games |
|---|---|---|---|
| ☐ Books | ☐ Food & Drink | ☐ Music | ☐ Travel |
| ☐ Computers | ☐ Health & Beauty | ☐ Office | more categories |
| ☐ Electronics | ☐ Home & Garden | ☐ Sports & Fitness | sub-menus |

We need to know how to formulate a query for you, how to communicate with you, and how to understand your responses.

Choose One:
- ☐ I'll tell you now by filling in A, B, C, D, E, and F now.
- ☑ I'll tell you later. I'll fill in A, B, C, and D now so you can contact me.
  (click here for instructions)

The following inputs provide methods to query your site, to communicate, and to extract information from your response. For each set, choose the response corresponding to your site. (click here for further details.)

A. Language used to query your site:

| ☐ C/C++ | ☐ MQSeries | ☑ URL |
|---|---|---|
| ☐ Cobol | ☐ Pascal | ☐ VBScript |
| ☐ Corba | ☐ Python | ☐ XML |
| ☐ Java | ☐ TCL | more |

B. Template of Query Language: http://www.delta.com/cgi/getmethods

C. Protocol used for sending to you: ☑ HTTP ☐ HTTPS ☐ FTP ☐ TCP/IP ☐ e-mail more

D. Protocol used for receiving from you: ☑ HTTP ☐ HTTPS ☐ FTP ☐ TCP/IP ☐ e-mail more

E. Language used by your site to respond:

| ☐ C/C++ | ☐ Pascal | ☐ VBScript |
|---|---|---|
| ☐ CSV | ☐ Perl | ☐ VBA |
| ☐ Grep | ☐ Python | ☐ XML |
| ☐ Java | ☐ TCL | more |

F. Template of response langauge:

[ Submit ]  *Thank you.*  [ Clear ]

Add InfoSource ftp/email

This page provides directions for sending your site information to us via either FTP or e-mail. (For more detailed instructions, click here)

| | |
|---|---|
| Your file or the body of your e-mail must be in text form and have lines that begin with a keyword followed by a colon (":"), then followed by your information. The keywords are below. | |
| Keyword | Description of information |
| Name | Your name, for contact purposes |
| Company | Your company |
| Address | Your mailing address |
| Phone | Your telephone number |
| Fax | Your facsimile number |
| e-mail | the e-mail address you want correspondence to go to |
| query categories | categories in which you want queries to be sent to you |
| method definition time | either "now" or "later". "Now" means you will fill in the rest of the fields, while "later" means you will tell us only how to query your site to contact you. |
| query language | One of the acceptable languages currently processed. |
| query template | A template in the above query language we can process to formulate a query to you |
| send protocol | One of the acceptable protocols currently allowed. |
| receive protocol | One of the acceptable protocols currently allowed. |
| response language | One of the acceptable languages currently processed. |
| parse template | A template in the above receive language we can process to parse a query received from you |

Please send your file as the body of an e-mail message to infosource@searchcraft.com or ftp it to ftp.infosource.searchcraft.com.

FIG. 17

METHOD FOR SEARCHING FROM A PLURALITY OF DATA SOURCES

CROSS REFERENCE TO RELATED APPLICATIONS

This application is a continuation application of application Ser. No. 09/441,270 filed Nov. 16, 1999 and now pending.

BACKGROUND OF THE INVENTION

The present invention relates to methods for searching for information in a plurality of information sources connected to a computer information network and specifically to searching databases on the Internet.

The ARPANET, a predecessor to what is now called the Internet, was started in the late 1960's under J. C. R. Licklider at the Defense Department as a way for a government research funding agency to save costs and to allow its users to share information by having its researchers share computers rather than each institution having its own. Using hardware and software protocols developed for this purpose, users could be at their own terminals but access a computer anywhere on the network as if it were in their own location. The targeted use was remote terminal access, but other uses (such as electronic mail) quickly became widely used. In those early days the number of computers was small and many of the researchers knew each other, because the only computers allowed on the network were those belonging to institutions funded by the Advanced Research Projects Agency of the United States Department of Defense ("ARPA", later called "DARPA"). Over time many more computers (and users) were added, and access to the Internet became more widespread as the National Science Foundation allowed its researchers and others affiliated with its initiatives to connect to the DARPA network (which later became known as the Internet).

In the 1990's two major evolutions occurred that helped lead to the explosive growth of the Internet. The first was that commercial enterprises were allowed to connect their computers to the Internet without the prior requirement of having a government-funded research project. And second, the World-Wide-Web (the "Web") protocols and software were created.

From the earliest days a few commercial enterprises were allowed to connect to the ARPANET. However, this was carefully controlled by DARPA, which allowed only those at the cutting-edge of computer research (such as Xerox's Palo Alto Research Center and the computer laboratories of the Massachusetts Institute of Technology) to connect. Later other companies' internal networks were inter-connected (such as IBM's BITNET) as the value of being able to communicate rapidly among companies, government agencies, and educational institutions became clear. But there was little incentive for most other companies and institutions to connect. The ideas underlying the Web had been germinating for some time. Tim Berners-Lee managed the research group at CERN that introduced the Web protocols and software in 1990 that is credited with making these concepts practical and accessible to millions of people. This was done just at the right time to capture the attention of most of the computing world, including the information technology industry and the media. The Web embodied, simultaneously, easy-to-use software and the promise of universal access to a large variety of information. Building on years of Internet protocol development, creation of freely-accessible content, the evolution of low-cost computer networking, and a growing desire for operating system and hardware-independent standardized access, the Web quickly became a dominant computer phenomena of the second half of the 1990's.

This has resulted in explosive growth of the Internet. The number of computers attached to the Internet is estimated to have increased from fewer than one million in January, 1993 to over 40 million six years later. It is also estimated that the number of users with access to the Internet will have increased from 20 million in 1996 to 140 million in 2002.

Along with the explosive growth in computers and users came an even more explosive growth in the information available to those users. Each computer connected to the Internet is potentially a source of information (although many are accessible only to people within a security perimeter, because they are inside a corporate or other institution). Each computer may contain thousands or millions of documents and information files. This is in contrast to the early days of the network, when only a limited number of computers contained documents and files relevant to a limited a set of research subjects. Compounding the issue is the great diversity of information available. Many of the information nuggets available do not fit neatly into the world's standard information classification schemes (e.g., the Dewey Decimal System or the Standard Industrial Classification codes for companies).

The Internet is a great advance for the communications ability of individuals and organizations, because many individuals and most organizations have the financial means to connect to the Internet. Furthermore, a great deal of the world's explicit information (that is, information that is written, graphic, audio or visual) is also available on the Internet. But this very success has caused a major problem that is slowing the usefulness of the Internet itself. The problem is the difficulty of locating relevant information in answer to any particular query.

Current technologies for search-and-retrieval all suffer from problems which cause retrievals to contain irrelevant, non-existent, and out-of-date references, and additionally to contain so many references that the retrievals overwhelm the capacity of a person to find the particular information sought.

Prior art information retrieval processes typically use the measures of "Recall" and "Precision" to assess the efficacy of an approach. Today, the immense size and dynamic nature of the Internet, which has become the database of choice of most people and which is searched most frequently, requires the additional evaluation measures of Ranking and Timeliness.

DEFINITIONS

Recall: Recall is a measure of the completeness of retrieval. Recall is defined as the ratio of the number of relevant documents returned to the total number of relevant documents in the database. For example, if one is looking for information about widgets, and working with a database of one million documents in which there are 100 relevant documents, a search which returns 40 of those 100 has Recall of 0.4 (40/100). The Recall factor is independent of the total number of returns obtained from the search.

Precision: Precision is a measure of the purity of retrieval. Precision is defined as the ratio of the number of relevant documents returned to the total number of documents returned. In the previous example, if the search had returned 50 documents in total, then the Precision would be 0.8 (40/50). The Precision factor is independent of both the total number of documents, and the total number of relevant documents, in the database.

Ranking: Ranking is a means of helping the user locate the information sought when the retrieval is very large, and consists of the search system indicating to the user some measure of the level of relevancy of each response. This is in recognition of the fact that people get overwhelmed by too large a retrieval, and typically look only at the first few responses. A retrieval list of 1,000 unranked responses is virtually worthless, except to suggest to the user to limit the search. No good metrics have been developed yet for comparing the Ranking of different search systems.

Timeliness: Timeliness is a measure of the relevancy of responses in a retrieval due to the age of the responses. The concept of Timeliness is related to the fact that information generally loses its value with time. This simplification is clearly incorrect when it come to historical data which does not change with time, but it is generally true when applied to descriptions of the present (e.g., the names of movies playing this week). Timeliness concerns not only the issue of out-of-date responses (e.g., an old list of "movies playing this week"), but also the issue of the age of the index itself (e.g., an old index may not contain documents about current "movies playing this week". No good metrics have been developed yet for comparing the Timeliness of different search systems.

It must be remembered that the user making the search is almost always interested in the Recall and Precision of the search results relative to the actual documents, not in the Recall and Precision of the search results relative to the index entries. Thus, a search methodology which obtains perfect Recall and perfect Precision on its index entries, but which returns index entries which reference only documents which no longer exist, is of little use to the searcher. This can happen if the index is out-of-date; i.e., if the index is very low in Timeliness. Thus, higher Timeliness tends to make for higher Recall and higher Precision by decreasing the number of out-of-date entries, and increasing the number of relevant entries, in the search space.

Ideally, Recall and Precision would be 1.0, Timeliness would be high, meaning that all responses would be current, and the Ranking of the responses would agree exactly with the ranking the user would make. This would mean that only relevant documents would be located, and that all relevant documents would be located.

There are a number of current approaches to solving the generalized query problem. The major ones include:

Directories of categories, with knowledge sources attached to the category most appropriate to them. The Dewey Decimal System is an example of this approach, while newer examples include the Internet directories such as Yahoo! and the Open Directory Project.

Structured-form domain-specific databases that contain information directly or references to that information. User queries are converted to database queries in a language such as SQL (Structured Query Language). An example would be a database of books, where each item in the database (information about a particular book) contains fields such as the author's name, the title of the book, the publisher, the date published, and so on.

Free-form text archives. The free-form text systems work with a set of documents by creating indexes which contain each word along with references to the documents in which that word is contained. A user query can then be analyzed for the words it contains, and a list of documents containing those words can be retrieved from the indexes. Refinements include the use of common word filtering (removes "a", "the", "and", etc.), Boolean combinations ("and", "not", etc.) of the words sought, phrases (search for the phrase "poisoned by food"), proximity (the word "food" within 20 words of the word "poison"), word stems (e.g., converting plurals to singular form), wildcards, word-level synonyms, and so on. Current Internet search engines typically work on this principle.

Concept search. A representation of the meaning of the information source is created, and then matched with the meaning of a query. There are a variety of approaches to this, generally falling under the heading of "natural language understanding" and "knowledge representation".

None of the foregoing approaches has solved the basic Internet search problems, and each has distinct strengths and weaknesses.

The directory approach is somewhat effective, and sometimes produces useful results (it has reasonable Precision, but poor Recall). The Dewey Decimal System has been in use for quite some time, but provides only a starting point for search. The Standard Industrial Code that classifies companies is not useful in the context of most queries and is being supplanted. In the Internet, Yahoo's hundreds of categories covers a small percentage of the World Wide Web sites; the Open Directory Project's 8,000+ categories is still a small percentage of the desired number. Further, many find that information items are misclassified or that the information sought cannot be found using a directory structure because either there is no mechanism for following the directory hierarchy to find the information, or the information does not fall clearly into any of the allowed categories, or the category to which it belongs is so broad that it has too many entries (in some cases millions).

Categories are similar to the field definitions in a structured database system: they define and thus limit the search space. The chief benefit of the Directory approach is the nature of hierarchy itself—in a Directory one always can be assured that there is a place to put every kind of information. Unfortunately, this does not adequately solve the search problem.

Domain-specific databases limit search to predefined dimensions (e.g., a given database might permit one to search for a book by author but not by genre). There is little possibility that this technology could answer a search that falls outside its domain of discourse, because the domain defines the universe to be queried. A famous example of this in the research literature discusses the issue of when a database field is defined as a person's hair color, but the person is bald. Structured databases appear to work only within relatively small domains of interest which can be tightly bounded. Even in such circumstances, there may be multiple valid (but different) views of (i.e., sets of dimensions for) a domain. For example, the nature and representation of a "customer" varies not only among different companies, but also within parts of a single company. Domain-specific databases have good Recall and Precision, but only within their domain of discourse.

The most-used technique for wide-scale search today is the Free-form text search. Its primary advantage is that the indexing can be done completely automatically, thus enabling a larger coverage of existing sources than the approaches described above. Traditional commercial information retrieval services (such as Dialog) work primarily with this technology. Most Internet search engines also use this approach as their basic technology. They work by having a spider program read all Web pages they can reach and create large indexes of the words they find (including the words in the "meta-tags" that an author has added to the page to help indexing). Depending upon the sophistication of the technology used, these indexes can be created from the entire document or from only the first few lines, or from word stems as well as the complete words, or from word synonym tables or thesauruses.

Several different technologies have been developed to facilitate the search for information within computer databases using the Free-form text approach. The following is a brief discussion of each of the major techniques, along with a summary of their relative strengths and weaknesses.

Boolean search is the earliest, most primitive technology. It lets the user specify words or terms to be searched using logical operatives like "and", "or", and "not". This results in retrievals high in Recall, rather low in Precision, and poor in Ranking, and their Timeliness depends entirely on the age of the database.

Fuzzy Boolean search lets the user specify a series of words or terms, then ranks the matching documents in order of those containing all of the terms, then all but one, etc. This allows the user to add more terms to their search parameters, and maintain high Recall, but also increase Precision, at least at the top of the list. Unfortunately, this type of search only reveals the obvious, as it has no means of discovering relevant documents that may contain similar terminology, and it is no better than regular Boolean with regards to Ranking or Timeliness in most cases.

Vector-based search goes an additional step in ranking by looking at the rate of occurrence of the specifying terms in each document relative to their rate of occurrence in all documents in the database. It assumes that specified terms which are relatively rare in the collection are more important, and gives higher ranking to documents in which they occur. In addition to this recognition of global statistics, Vector-based search technology uses a geometric model to create a different axis for each specified term, and gives a value for the relative frequency of occurrence of the term in each document. Thus every document can be located as a vector within the space of the model. What often happens is that similar documents group in one area of the model, and the user can then create a query to select all documents within that area. While Vector-based searching can improve Precision, it won't improve Recall, because it will not bring back documents that are relevant, but don't contain the initial query terms. Compared to Fuzzy Boolean, it improves Ranking, but brings back the same documents, and has no effect on Timeliness.

Thesaurus-based search attempts to increase Recall. Here, a thesaurus of terms which are synonymous with various terms contained in the database is manually created. Thus when the search terms are specified, the search engine also looks for synonyms, increasing Recall but often results in lower Precision due to the widening effects of using synonyms. Unfortunately, because of the time-intensive nature of creating a thesaurus, this method is cost-effective only to small databases which are relatively narrow in their subject matter. Thesaurus-based search is no better than vector-based search in Timeliness, and can be worse with respect to Ranking.

Automatic Query Expansion search creates a thesaurus automatically by including terms that have a high coincidence in documents that contain the specifying terms. Then the search engine performs a second query, including the newly-created thesaurus terms. This gives some of the Recall benefit of thesaurus-based systems, but still tends to adversely affect Precision, although Ranking and Timeliness are not affected.

Structured Query search typically requires the user to set up a very complicated query, which may take an experienced user as long as 30 minutes to develop. This is fine for sophisticated users who have the time, but it is impractical for the typical Internet information seeker.

Latent Semantic Indexing search is the only technology in this list which completely bypasses the Boolean process. Like Vector-based search, it creates a geometric representation of each document in the database. By reducing this information to a matrix and using mathematical manipulation, it attempts to correlate related terms and thus recognize the separable contents of each document. This helps increase Recall, Precision, and Ranking, but at a great computational cost which makes it very slow and impractical for large databases, and as with all other prior art methods, Timeliness is dependent upon the age of the database.

There are a variety of other approaches used to improve the results of the basic Boolean search. These include word frequency, pattern-based searches, popularity and search-by-example refinement.

Word frequency ranking is a standard technique to count the number of times that each word appears in a document. However, it makes the overly simplistic assumption that the more often a word appears, the more likely the word is to represent the content of the document. The document's rank, that is, the closer it will be placed to the beginning of the result list, is then based on the count. In general, ranking documents is a technique designed to compensate for low precision.

Another technique is to use pattern-based logic, or variants of fuzzy logic, which allows the user to specify information in a more general way. This can be as simple as use of "wildcards" in a search pattern. For example, the pattern "own*" might indicate that the user wants documents containing any of the words "own", "owns", "owner", "owning", etc. Another type of fuzzy search is described above as fuzzy Boolean search. More sophisticated techniques in this area include attempts to define a set of words that are similar in intent to each word in a vocabulary (in effect, a thesaurus), and expand the search to include such similar terms (for example, searching for "own" might also automatically search for documents containing the word "possess"). In general, fuzzy logic is a set-theoretic numeric technique that is very difficult to apply in non-numeric areas such as words and concepts, and thus has not been widely available in this area.

Another attempt to increase Ranking is the use of popularity measures. This technique keeps track of query terms and the responses that people actually view afterwards. This information is then used with future queries: the terms contained in a query are looked up in the history database, and the results are ordered based on their popularity in terms of actual usage in the past. Another popularity technique is to use the number of hyperlinks that point to a page as a measure of its importance, and likelihood of being appropriate. Popularity techniques are based on the assumption that what people looked at is what they really wanted to find, and that future queries will have the same goals.

Search-by-example refinement allows the user to look at the list of response results and designate some that are the most appropriate. The system then attempts to create a search that will be more likely to retrieve information similar to those. Technically, the system creates a more complex set of Boolean conditions based on the attributes of the given examples. The problem is that it is not clear to the system which attributes of the responses are the ones the user is indicating, and this technique has not proven effective in practice. The existence of this technique is yet another indication of the poor results generally experienced with Free-form text retrieval technology.

All of these free-form text approaches suffer from the problem that the search system does not understand either the information in its domain of discourse, or the query. This basic failing results in returning irrelevant results (often far too many), and in missing relevant ones.

Concept search attempts to solve the first of these problems. All of the concept search approaches tried to date define "concept" in various ways and then use this notion of concept as a node in a directory hierarchy. They then use the directory methods as described above. Each approach has some methodology to extract the concepts from the user query, which are then used to determine hierarchy nodes that are relevant. These nodes have information sources (usually documents or Web pages) linked to them, which are displayed as the result of the query.

Definitions of "concept" have included ad-hoc terms that the researcher deems a concept, synonym sets that attempt to define a concept as a whole, and some computer-executable language constructs based on the predicate calculus (a central term with conditions attached, such as the concept of a "man" as a person whose gender is male.) Each approach has a different way to extract the "concepts" from a user query, for example, if concepts are defined as synonym sets then the words used in the query are indexed in a thesaurus to get the relevant synonyms.

Other work has been undertaken at the Digital Library project at Stanford University. However, its efforts are directed at the creation of lower level enabling technologies for the effective and efficient search and retrieval of text based documents as are commonly found in electronic libraries.

These systems all suffer from problems of the limited nature of current natural language systems (they work on only limited domains of discourse); the primitive notion of concept; and the lack of robust mechanisms to describe the concepts involved in information sources.

In addition to the problems with the prior art methods discussed above, none of the above techniques solves—or even attempts to solve—the problem of Timeliness. This is because the indexing methods used assume that all information put into the index is static, i.e., that the page indexed will be obtained again at a later time at the same URL address.

This assumption that most indexed information is static information is increasingly incorrect for two reasons. First of all, even so-called static pages (e.g., historical text) can be changed, the most common example being that the page goes out of existence entirely. (What Web searcher hasn't had the experience of searching for some particularly obscure item only to find that the URL of the seemingly best return "cannot be located on this server"?)

But of even more importance is the fact that an increasing number of pages on the Web are either pages of a type which themselves do not contain information typically sought but which are the gateways to such information (e.g., a query form of a vendor), or are pages which themselves are dynamically generated (i.e., pages which are created only at the time of being accessed). Prior art indexing methods typically ignore query forms, and typically are fooled into indexing the words of a dynamically generated page even though the next accessing of that page will almost certainly find different words than those which were indexed.

The prior art methods used by central authorities (e.g., a "Mall" on the Web) for searching multiple databases belonging to multiple vendors include: (1) copying all of the databases into one centralized database and converting them all into one uniform database; (2) sending the same form of query to all of the databases, regardless of the form of query which the database was organized to receive; and, (3) sending a customized query to each database, the customized query being generated by a computer program manually written specifically for that database by a programmer.

The first method is used internally in enterprises under the label of an "enterprise data warehouse," and by some Web-based shopping malls such as Yahoo! Store. It has the major disadvantages of requiring enormous effort to create an adequate central database design, using least-common-denominator content, and never having the central database up-to-date.

The second method is primarily useful in a situation of identical, replicated databases, because otherwise the query will not match each database's vocabulary. In a diverse database environment (e.g., multiple information sources on the Web), this method will most often produce "query not understood" responses and therefore this method cannot generally be used.

The third prior art method overcomes the problems of the previous method, but at the cost of requiring manual programming for each database. This creates an environment which cannot economically scale beyond a relatively small number of information sources. Even more significantly, the environment cannot automatically adapt to changes in an information source's database structure, thereby requiring that even minor changes in structure require re-programming. These effects are evident in the present situation wherein current Web-based shopping malls cannot cost-effectively handle more than about 2,000 vendors.

Thus, the increasing lack of Timeliness, the inability to index or obtain current information through query forms, and the poor indexing of dynamically generated pages, are all contributing to ever-decreasing Recall and ever-decreasing Precision, with the result that prior art techniques are increasingly unable to solve the problem of finding current information in an increasingly broad, large-scale, and dynamic computer information network, such as the Internet, shown schematically in FIG. 1.

SUMMARY OF THE INVENTION

The present invention solves the problems just stated with a set of mechanisms which are robust and which work with both static and dynamic information sources, including query forms.

The approach of the present invention includes sending a customized query to each database, wherein the query is automatically generated without the need for human programming. This is accomplished by obtaining from each information source, not its database, but rather the information describing how to query its database.

This query information is contained in a descriptive packet associated with the information source, and is contained in a database referred to as a "searchbase". The searchbase contains the identity of the information source, the descriptive packet associated with the information source, and associations with the categories of information about which the information source is organized to be queried. The searchbase also may contain information concerning the parties associated with the information source, such as the author, provider, and/or publisher of the information source, and/or information about the content of the information source and/or its database, such as copyright and patent information, licensing information, associated fee and/or cost information, and information about how to purchase the information or the items referenced by the information.

A descriptive packet contains a single query method. Thus, if a vendor, for example, uses three query methods which require the use of three query forms (perhaps for use with three different product lines), for purposes of the present invention the vendor is treated as though the vendor were three vendors, each the publisher of one information source.

Thus, there is a one-to-one correspondence between information sources and descriptive packets, as shown in FIG. 2B.

The information sources may be associated not only with vendors, but also with any party providing information. Examples include organizations which provide news, financial information (such as stock quotations), sports information, weather reports, traffic reports, entertainment information (such as ticket availability), business information (such as travel information, travel schedules, and hotel availability) and databases (such as telephone listings, membership lists, laws and regulations, and library or other collection holdings). The method of the present invention is particularly useful for parties providing information which is most valuable when it is current.

Each information source may be associated with more than one category with respect to which it is organized to be queried, and any particular category may be associated with more than one information source. Both these possible relationships are shown on FIG. 2B.

The searchbase itself contains the relationships between categories and information sources and the associated descriptive packets. A "node" may be considered to be these relationships with respect to a particular category. Thus, in FIG. 2B, the nodes shown are: A-IS1-DP1; B-IS2-DP2; B-IS3-DP3; C-IS4-DP4; D-IS4-DP4, etc. The categories themselves have inter-relationships, and are organized in a hierarchy (discussed later), but this hierarchy is not part of the searchbase itself. Many different types of associations between the categories and the information sources are possible, and each type requires its own method of applying an inquiry to the searchbase. Two such methods are shown in FIGS. 3A and 3B, and are discussed later. The invention uses a mechanism for creating and evolving an index of information sources; a mechanism for storing information which enables accessing both static and dynamic information sources including query forms and which allows the retrieval of both static and dynamically-generated information from those information sources; a mechanism for extracting query parameters from a user search request which can be used to search the searchbase; a mechanism for using data retrieved from the searchbase to query relevant information sources and retrieve the relevant answers to the query; and a mechanism for presenting the retrieved information to the user who made the search request.

The mechanism for creating and evolving an index of information sources involves a network of categories of information. This network of categories is not necessarily a mathematical tree (that is, each category element has one and only one superior element), but may be a hierarchical network (e.g., one with multiple parent elements). Associated with each category element of the network may be descriptive information which facilitates search-request-to-element associations and descriptive packages which facilitate element-to-information-source associations. The network is created by both a centralized authority and by submission from the authors of the information sources or third parties. This keeps the networks relevant and realistic. That is, the authors of the information sources (e.g., vendors and database managers) understand better than anyone else what categories are meaningful to their information and how to categorize their own information. The network also includes mechanisms to cross-reference and link elements that might otherwise not be clearly related. For example, assume that the hierarchy contains:
    shoe
        sport-shoe
        sport-shoe-walking
        dress-shoe
        dress-shoe-fake-comfortable
then there might be a link expressing the equivalence of sport-shoe-walking and dress-shoe-fake-comfortable.

The mechanism for storing information in the searchbase which enables accessing both static and dynamic information sources including query forms comprises each node in the searchbase having associated with it a descriptive packet which describes an information source that purports to contain information relevant to the category of that node (shown schematically in FIG. 2B). Each packet contains within it the information needed by a computer to access information from the associated information source. The information contains at least an identification of the information source and machine-executable method descriptions of how to query the information source and how to receive and analyze the information which results from that query. For purposes of the foregoing, a "method description" may be considered to be a set of sentences in a computer executable language by which the language processor program for that language interprets the sentences to achieve the desired action.

The descriptions for querying the information source comprise a query language, a template for use with that language (i.e., a sample of the structure of a query expected to be received by the information source), and a sending protocol (which is a receiving protocol for the information source).

The descriptions for receiving and analyzing the information which results from the query comprise a response language, a template for use with that language (i.e., a sample of the structure of a response given by the information source in reply to a query), and a receiving protocol (which is a sending protocol for the information source).

The sending and receiving languages may be the same or different languages, and the sending and receiving protocols may be the same or different protocols.

The central authority maintains the computer-executable language definitions and language processors. The searchbase contains the method descriptions in the descriptive packets for each associated information source.

The central authority may be one or more computer systems which may be geographically co-located or geographically dispersed. The central authority also may be functionally dispersed, including having parts of its functionality operating on the search requester's computers or the computers on which information sources reside, for example, by means of the use of cookies, browser plug-ins, and server-side applications. Similarly, the searchbase may be in a single location or geographically dispersed, and may be resident on one or more computer systems, including those of the search requester and one or more computers on which the information sources reside. Numerical computations, search functions, and control functions may all be performed by the central authority either serially or in parallel.

The languages may be procedural languages, such as C or Java, or may be declarative languages, such as a URL or XML. A method description may access both static and dynamically-generated information sources, and may retrieve from those sources both dynamically-generated information and static information, including executable programs such as JAVA applets. For this purpose, dynamically-generated means that the content is created only when a request for it is received, and static means not dynamically-generated. By this definition, all information retrieved from a query form is dynamically generated (whether the query form itself is static or dynamically generated), and all information retrieved from a standard Web page is static (even though, the publisher of the page may change its content from time to time).

As an example of the foregoing, consider a method description which designates a URL as the query language, HTTP as the sending protocol, HTTPS as the receiving protocol, the GREP pattern matching language as the response language, and an appropriate parsing template for use to parse the response made in GREP. If the query template is the URL "http://www.startup.com", then information will be retrieved from a static information source (a Web page), while if the query template is the URL "http://www.startup.com/query.cgi?product=foo", dynamically-generated information (almost certainly) will be retrieved.

The mechanism for extracting query parameters from a user search request which can be used to make an inquiry of the searchbase comprises entering user search requests in a variety of ways, including predefined forms, pick-lists, browsing of the searchbase categories, word-search, and natural language. The set of mechanisms also include storage of information that relates terms (words, word stems, phrases) to searchbase categories. These linkages and programmed inference rules, which relate sets of searchbase nodes, thereby creating a concept thesaurus, are created by both a central authority and by the authors of the information sources. A variety of word-search and natural language technologies can be applied to free-form input, as described in the background section above, again provided that the searchbase and the linkage information is available.

The mechanism for extracting query parameters from a user search request may also include further dialog with the user, including clarification, narrowing, broadening, and/or other refinements of the user's search request.

The mechanism for using the data retrieved from the searchbase to access the relevant information sources and retrieve the relevant answers to the query comprise the information packages described above.

The process of accessing an information source relative to a given search request comprises extracting query parameters from the search request utilizing the search-request-understanding methods and interpreting the access method using the appropriate language processor with the parameters generated by the search-request-understanding methods. The parameters may be substituted into the access method description, or may be made available to the interpreter with linkages from standardized variable names to the parameter values (e.g. "color"→value for this query). The interpretation of the access method will generate values that become the parameters of the next step in the process (e.g., the identification of a connection to the information source).

The sending of the generated query to the information source is accomplished by the execution of the program using the sending protocol. Such protocols may be standards such as HTTP, HTTPS, and FTP. The protocol submitted may include these base protocols along with additional information such as login ID and password. Protocols also may indicate responses to requests for information such as cookies and client-side information. For example, a protocol description submitted to the searchbase may indicate HTTPS along with the digital signature to be used for authentication. (Additional inputs would be provided as required during use of the input forms of FIG. 12A if the user indicted a selection which might require such additional inputs, for example, HTTPS.) Proprietary protocols built into the access methods (e.g., the "Betty Beta" example of FIG. 14A) also may be used. The protocol description allows access and retrieval from information sources that personalize their responses based upon parameters in the search request from the user's system. For example, if a search request included information indicating the party for whom the search was being conducted, the information source could tailor its responses using information about the user that was known to the information source (e.g., from its own database, or from a cookie in the user's computer), so as to return results more useful to the user than otherwise would be possible.

The process of retrieving the resulting information relative to a given process of interpretation comprises interpreting the receiving protocol to receive the response and interpreting the retrieval method using the appropriate language processor with the parameters generated by the access instance and the response information. The process of parsing the resulting information relative to a given retrieval instance consists of interpreting the parse method using the appropriate language processor with the parameters generated by the retrieval instance.

If the information retrieved is cached (e.g., in a central searchbase), the retrieval method may be marked as requiring a re-execution. That is, the retrieval should happen directly from the information source at the time of the query, thus making sure that the information is as up-to-date as the information source provides.

The response may be a "negative acknowledgment" or NAK. This response may indicate any of several possibilities, including that the information source does not have any response which meets the search criteria (i.e., the answer to the query is the null set), or that the information source does not understand the query submitted, or that the information source is unavailable at the moment, or that the information source is unidentifiable or may no longer exist.

The mechanism for formatting the retrieved information for presentation to the user who created the search request comprises:
1. parsing the retrieved information and extracting the resulting structured information,
2. collecting all structured information results from one particular search request into one information set,
3. sorting or ranking the results based on a user-specified criteria, if any, and
4. preparing a presentation whose output is then sent to the user for display.

This output is itself in an appropriate language, such as HTML or XML. An example of a presentation might be a tabular list of all results, with each entry containing a description, attribute values, and an identification, such as a URL (e.g., a hyperlink) which when selected would provide the user with the complete information about that entry.

The method as described allows search of both static and dynamic information sources with static descriptive structure (such as the information categorization). It also allows information sources to have dynamic descriptive structures.

In the latter case an information packet describing the information source contains a method for accessing and retrieving information about the descriptive structure of the information source. This structural information may include the information categories relevant to the information source as well as the other information packets previously described that in total allow the searchbase to access and retrieve information from that information source.

One objective of the present invention is an improved method of searching for information on a computer information network.

This objective is achieved in accordance with the present invention by a method comprising providing a searchbase comprising a plurality of descriptive packets, wherein each packet is associated with one of a plurality of information sources published on a computer information network and includes a query language and template usable therewith, a sending protocol usable therewith and a receiving protocol usable therewith. A search request is received over the computer information network from a user for retrieving information from the plurality of information sources in accordance with given search criteria. The search request is transformed into an inquiry capable of searching the searchbase and the searchbase is searching with the inquiry to identify any of the plurality of information sources which potentially meet the given search criteria. The search request is transformed into queries for the identified information sources, wherein each query is constructed in accordance with the query language and query template in the descriptive packet for the corresponding information source. The queries then are sent over the computer information network to the identified information sources in accordance with the sending protocol in the descriptive packet for the corresponding information source and information is received over the computer information network from the identified information sources in response to the queries in accordance with the receiving protocol in the descriptive packet for the corresponding information source.

In accordance with a preferred embodiment of the invention, at least one of the plurality of information sources is a query form, at least one of the plurality of information sources is a static page, and/or at least one of the plurality of information sources is dynamically generated. The sending protocol and the receiving protocol may be the same or different protocols.

In another embodiment of the present invention a method of searching for information on a computer information network comprises providing a searchbase comprising a plurality of descriptive packets, wherein each packet is associated with one of a plurality of information sources published on a computer information network and includes a query language and template usable therewith, a sending protocol usable therewith and a receiving protocol usable therewith. A search request is received over the computer information network from a user for retrieving information from the plurality of information sources in accordance with given search criteria, and the search request is transformed into a plurality of queries for the plurality of information sources, wherein each query is in accordance with the query language and query template in the descriptive packet for the corresponding information source. The plurality of queries are sent over the computer information network to the plurality of information sources in accordance with the sending protocol in the descriptive packet for the corresponding information source, information is received over the computer information network from the plurality of information sources in response to the queries in accordance with the receiving protocol in the descriptive packet for the corresponding information source and any information sources from which information was received which meets the given search criteria is identified to the user over the computer information network.

In accordance with a preferred embodiment of the invention, at least one of the plurality of information sources is a query form, at least one of the plurality of information sources is a static page, and/or at least one of the plurality of information sources is dynamically generated. The sending protocol and the receiving protocol may be the same or different protocols.

In a further embodiment of the present invention a method of searching for information on a computer information network comprises providing a searchbase comprising a plurality of descriptive packets, wherein each packet is associated with one of a plurality of information sources published on a computer information network and includes an identification of the information source and a content description thereof, a query language and template usable therewith, a sending protocol usable therewith, a receiving protocol usable therewith, and a response language and parsing template usable therewith. A search request is received over the computer information network from a user for retrieving information from the plurality of information sources in accordance with given search criteria, and the search request is transformed into an inquiry capable of searching the searchbase. The searchbase is searched with the inquiry to identify any of the plurality of information sources which potentially meet the given search criteria, and the identity of the identified information sources is provided to the user over the computer information network.

In a preferred embodiment, in addition to providing the identity, at least a portion of the content description is provided. Furthermore, preferably, at least one of the plurality of information sources is a query form, at least one of the plurality of information sources is a static page, and/or at least one of the plurality of information sources is dynamically generated. The sending protocol and the receiving protocol may be the same or different protocols.

Additionally, the method may further comprise prior to the step of transforming, transforming the search request into an inquiry capable of searching the searchbase, searching the searchbase with the inquiry to identify any of the plurality of information sources which potentially meet the given search criteria and wherein the search request is then transformed into queries for the identified information sources. Preferably, the search request is transformed into queries only for the identified information sources. Furthermore, preferably, at least one of the plurality of information sources is a query form, at least one of the plurality of information sources is a static page, and/or at least one of the plurality of information sources is dynamically generated. The sending protocol and the receiving protocol may be the same or different protocols.

Furthermore, in addition to sending the plurality of queries, a query preferably is sent to at least one additional information source. The descriptive packet for the at least one additional information source may be obtained after receipt of the search request by receiving information in accordance with a receiving protocol usable with the at least one additional information source. The step of identifying to the user may comprise presenting at least a portion of the received information and/or organizing at least a portion of the received information and presenting the organized information to the user. Each descriptive packet may further include a response language and parsing template usable with the associated information source and wherein the step of identifying to the user comprises organizing at least a portion of the received information in accordance with the search request and the response language and parsing template in the descriptive packet for the associated information source and presenting the organized information. The query language and the response language may be the same or different languages. The received information may include dynamically generated information, static information, database, text, graphics, audio, video, control signals and/or computer programs.

The computer information network preferably is the Internet and the step of providing a searchbase may be performed either before or after the step of receiving a search request.

In a still further embodiment of the invention a method of searching for information on a computer information network comprises providing a searchbase comprising a plurality of descriptive packets, wherein each packet is associated with one of a plurality of information sources published on a computer information network and includes an identification of the information source and a content description thereof, a query language and template usable therewith, a sending protocol usable therewith, a receiving protocol usable therewith, and a response language and parsing template usable therewith. A search request is received over the computer information network from a user for retrieving information from the plurality of information sources in accordance with given search criteria, and the search request is transformed into an inquiry capable of searching the searchbase. The searchbase is searched with the inquiry to identify any of the plurality of information sources which potentially meet the given search criteria, and the search request is transformed into queries for the identified information sources, wherein each query is in accordance with the query language and query template in the descriptive packet for the corresponding information source. The queries are sent over the computer information network to the identified information sources in accordance with the sending protocol in the descriptive packet for the corresponding information source, and information is received over the computer information network from the identified information sources in response to the queries in accordance with the receiving protocol in the descriptive packet for the corresponding information source. At least a portion of the received information is organized in accordance with the search request and the response language and parsing template in the descriptive packet for the corresponding information source, and any of the identified information sources from which information is received which meet the given search criteria are identified to the user, and the organized portion of the received information thereof is presented to the user, over the computer information network.

Preferably, the query language and the response language are different languages and the sending protocol and the receiving protocol are the same protocols. The received information may include dynamically generated information, static information, at least one database, text, graphics, audio, video, control signals, and/or computer programs. The computer information network preferably is the Internet.

Another object of the present invention is to provide a method for creating a searchbase for information sources published on a computer information network.

In accordance with the invention this object is achieved by a method comprising obtaining information for each information source including an identification of the information source and a content description thereof, a query language and template usable therewith, a sending protocol usable therewith, and a receiving protocol usable therewith. A descriptive packet is produced for each information source from the obtained information and access to the searchbase is provided over a computer information network.

The step of obtaining may comprise obtaining additionally a response language and parsing template usable therewith and receiving information for at least one of the information sources, wherein the step of receiving may comprise providing a blank form for the information source and receiving a completed form for the information source and wherein the step of providing a blank form may comprise providing the blank form in response to a request therefor. The step of providing a blank form may also comprise publishing the blank form on the Internet. Additionally, the information required for the descriptive packet may be described in a publication, wherein the publication may be made on the Internet, by electronic publication, or in print media.

The step of receiving may also comprise receiving the information in accordance with a receiving protocol usable with the information source.

The step of obtaining may also comprise accessing at least one information source and extracting at least part of the information required for the descriptive packet. The step of extracting may comprise extracting information from at least one of meta-tags in the accessed information source and references obtainable from the accessed information source.

In accordance with a preferred embodiment of the invention, at least one of the plurality of information sources is a query form, at least one of the plurality of information sources is a static page, and/or at least one of the plurality of information sources is dynamically generated. Preferably, the query language and the response language are different languages, and the sending protocol and the receiving protocol are the same protocols. The computer information network preferably is the Internet.

Still another object of the present invention is to provide an improved method for searching indexed information over the Internet.

This and other objects are achieved in accordance with the present invention by a method comprising providing an index of publications published at URL addresses on the Internet, receiving a search request including search criteria, searching the publications by searching the index using the search criteria, retrieving a set of URL addresses from the index for publications which meet the search criteria, searching the publications currently available at the retrieved URL addresses using the search criteria and providing in response to the search request URL addresses in the set which meet the search criteria.

Preferably, the step of providing URL addresses comprises both providing only URL addresses in the set which currently meet the search criteria and providing all URL addresses in the set which currently meet the search criteria. The publications preferably include at least one database, text, graphics, audio, video, control signals, and/or computer programs. Preferably, the step of providing an index comprises creating the index.

These and other objects and advantages of the present invention will become apparent from the detailed description of the invention and with reference to the attached drawings, wherein:

BRIEF DESCRIPTION OF THE DRAWINGS

FIG. 1 is a diagram of a global computer information network according to the present invention;

FIG. 3A is a chart of showing one example of category-to-information-source associations according to the invention;

FIG. 3B is a chart showing another example of category-to-information-source associations according to the invention;

FIG. 11A is an example of a category database usable in accordance with the invention;

FIG. 11B is an example of vendor databases usable in accordance with the invention;

FIG. 12A is an example of a form usable to obtain information source information according to the invention;

FIG. 12B is an additional form usable with the form of FIG. 12A;

FIG. 12C is still another additional form usable with the forms of FIGS. 12A and 12B;

FIG. 13 shows the form of FIG. 12A filled in for an information source in accordance with methods of the present invention;

FIG. 14A shows the form of FIG. 12A filled in for a different information source in accordance with methods of the present invention;

FIG. 14B is the form of FIG. 12B filled in for the information source of FIG. 14A;

FIG. 15A shows the form of FIG. 12A filled in for a still different information source in accordance with methods of the present invention;

FIG. 15B is the form of FIG. 12B filled in for the information source of FIG. 15A;

FIG. 15C is the form of FIG. 12C filled in for the information source of FIG. 15A;

FIG. 16 shows the form of FIG. 12A filled in for a still further information source in accordance with methods of the present invention; and FIG. 17 is an example of an instruction form for the submission of information source information by FTP or e-mail according to the present invention.

DETAILED DESCRIPTION OF THE INVENTION

Referring now to FIG. 1, the method according to the present invention is carried out on a computer information network, preferably a global computer information network, such as the Internet 30. Connected to the Internet 30 are a plurality of servers 10A-10N servicing information sources 11A-11N respectively. The information sources can be a variety of sources, as will be explained hereinafter.

Users 20A-20N are connected to the Internet by conventional methods, such as by Internet service providers, intranets, cable television networks, DSLs, etc., so as to be able to communicate directly to servers 10A-10N, and to other users, so as to carry out conventional communications and the accessing of websites and information sources.

In accordance with the invention, a central authority 1 is connected to the Internet 30 for carrying out methods according to the present invention. The central authority preferably is one or more computer systems which may be geographically co-located or geographically dispersed and which carry out the functions for supporting the methods according to the present invention as shown by the control authority 1 in dotted lines. The central authority may be functionally dispersed, including having parts of its functionality operating on the user's or the information source's computers, and may make use of cookies, browser plug-ins, and server-side applications.

Figure 2A:
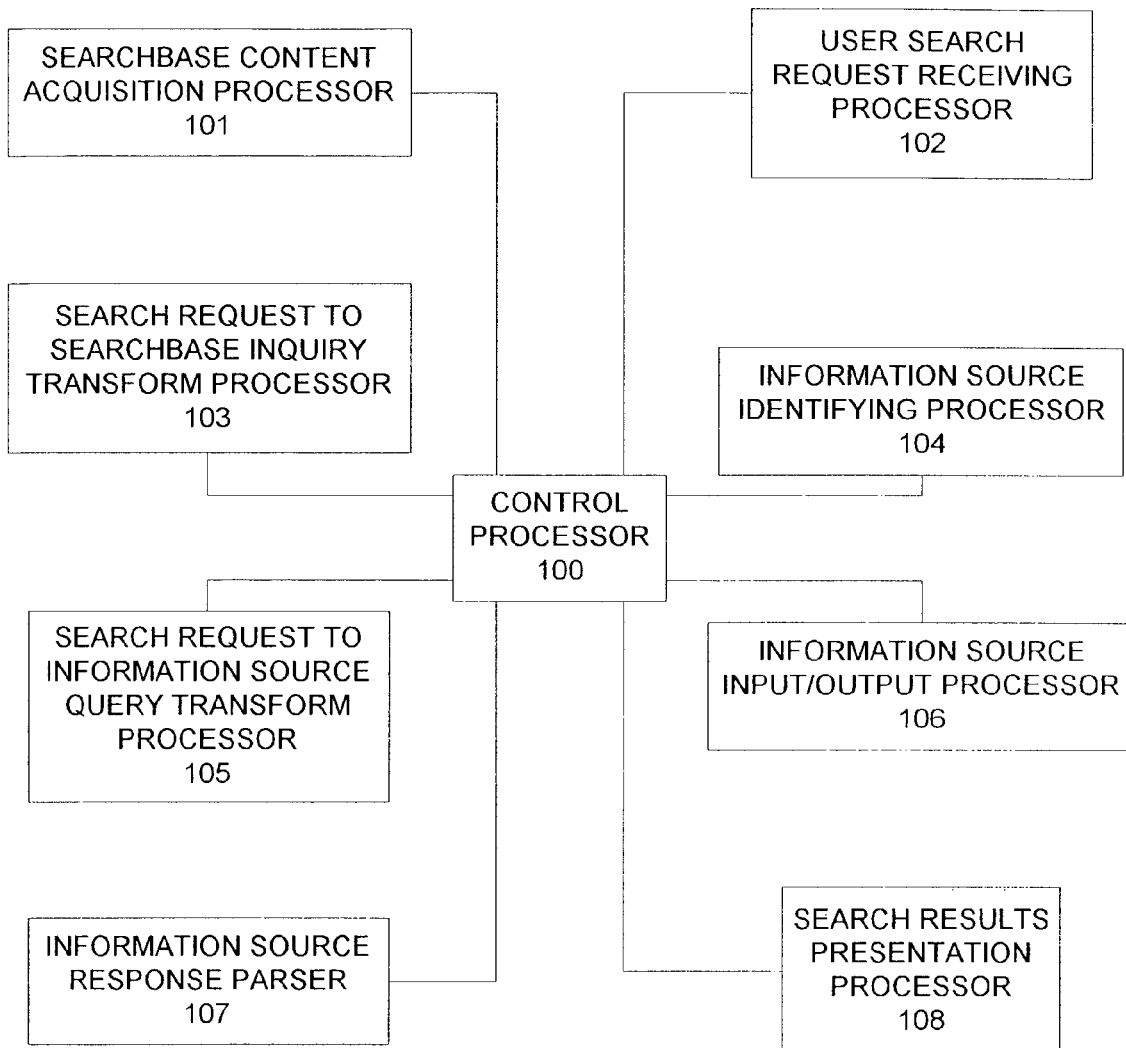
FIG. 2A is a diagram of the central authority of FIG. 1 for carrying out the methods according to the present invention.

The functional elements of the central authority are shown in more detail in FIG. 2A. It is understood that these functional elements may be implemented by a programmed computer, by a co-located or dispersed network of computers, or by discrete hardware elements.

At the heart of the central authority 1 is a control processor 100 which provides a mechanism for the overall control of the other functional elements which are connected to it and which transmit information to and from the control processor 100. The control processor 100 may not be necessary for the transmission of information between any two of the other elements if such elements are designed to interact directly with each other. If all such elements are so designed with respect to all of the other elements, the functionality of the control processor 100 will be fully dispersed among the other elements and there will be no need for a separate element 100.

The elements of the central authority include the searchbase content acquisition processor 101 which is a mechanism for the acquisition of searchbase content, as will be explained hereinafter. A user search request receiver processor 102 is the mechanism for receiving a search request from a user over the Internet 30. The search request to searchbase inquiry transform processor 103 is the mechanism for transforming a search request from a user into a inquiry of the searchbase. The information source identifying processor 104 is the mechanism for identifying information sources which potentially satisfy inquiry criteria. The search request to information source query transform processor 105 is the mechanism for transforming a search request into queries which are individually suitable for each of the information sources. The information source input/output processor 106 is the mechanism for sending queries to and receiving responses from information sources. The information source response parser processor 107 is the mechanism for parsing responses received from information sources, and the search results presentation processor 108 is the mechanism for creating a presentation of search results to a user of the Internet.

The processors 100 through 108 can be embodied in a single processor, such as a microprocessor or any of the processors 100 through 108 may be one or more computer systems which may be networked, which may be geographically co-located or geographically dispersed, and which may be functionally dispersed, including having parts of their functionality operating on the search requester's computers or the computers on which information sources reside.

Figure 2B:
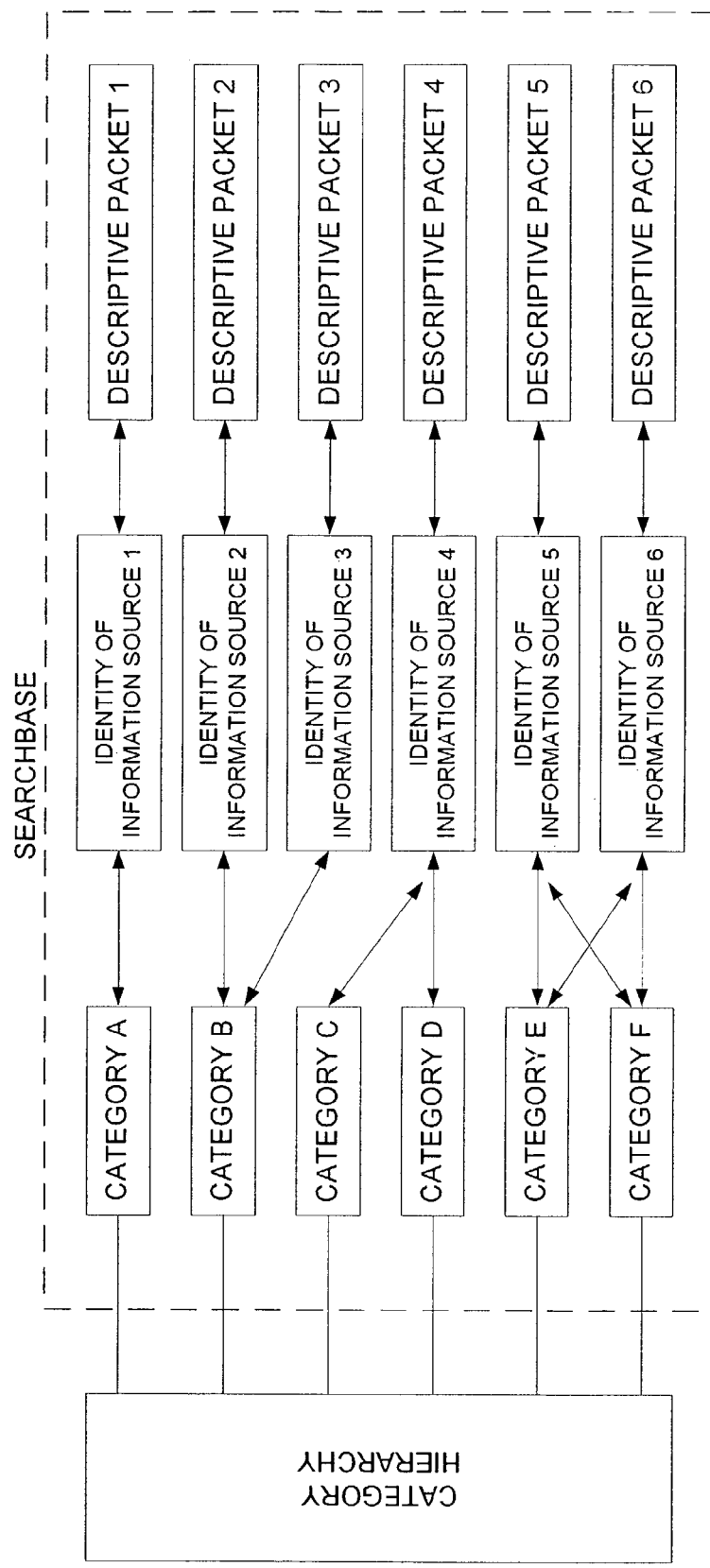
FIG. 2B is a diagram of the structure of the searchbase according to the present invention.

FIG. 2B shows the content of the searchbase according to the present invention. The searchbase is a structure connected to a category hierarchy as shown, which includes, for example, categories A-F. Each of the categories is associated with one or more information sources, which for the sake of simplicity includes information sources 1-6 shown in FIG. 2B. The arrows between the categories and the information sources exhibits the category to information source associations which are shown by way of example only. Therefore, for example, category B may have an association with more than the two information sources shown in FIG. 2B or have an association with as few as one information source.

Each information source has an associated descriptive packet 1-6 which includes information relating to the content of the information source as will be explained hereinafter.

FIG. 3A shows one example of category-to-information-source associations for an exemplary parent category "apparel", the sub-categories "shoes" and "sleepwear", and the sub-sub-categories of various type of shoes, using the category database shown in FIG. 11A, and information sources which are associated with vendors.

As shown, the vendor Alpha has an association only with the parent category "apparel", the vendor Beta has an association only with the sub-category "apparel-shoe", and the vendor Gamma has an association only with the sub-sub-category "apparel-shoe-athletic".

FIG. 3B shows an alternative method of forming category-to-information-source associations. Thus, in FIG. 3B, Alpha is associated with all of the categories under "apparel", Beta is associated with the category "apparel" and with all of the categories under the sub-category "apparel-shoe", and Gamma is associated with the category "apparel", the sub-category "apparel-shoe", and with all of the categories under the sub-sub-category "apparel-shoe-athletic".

Figure 4:
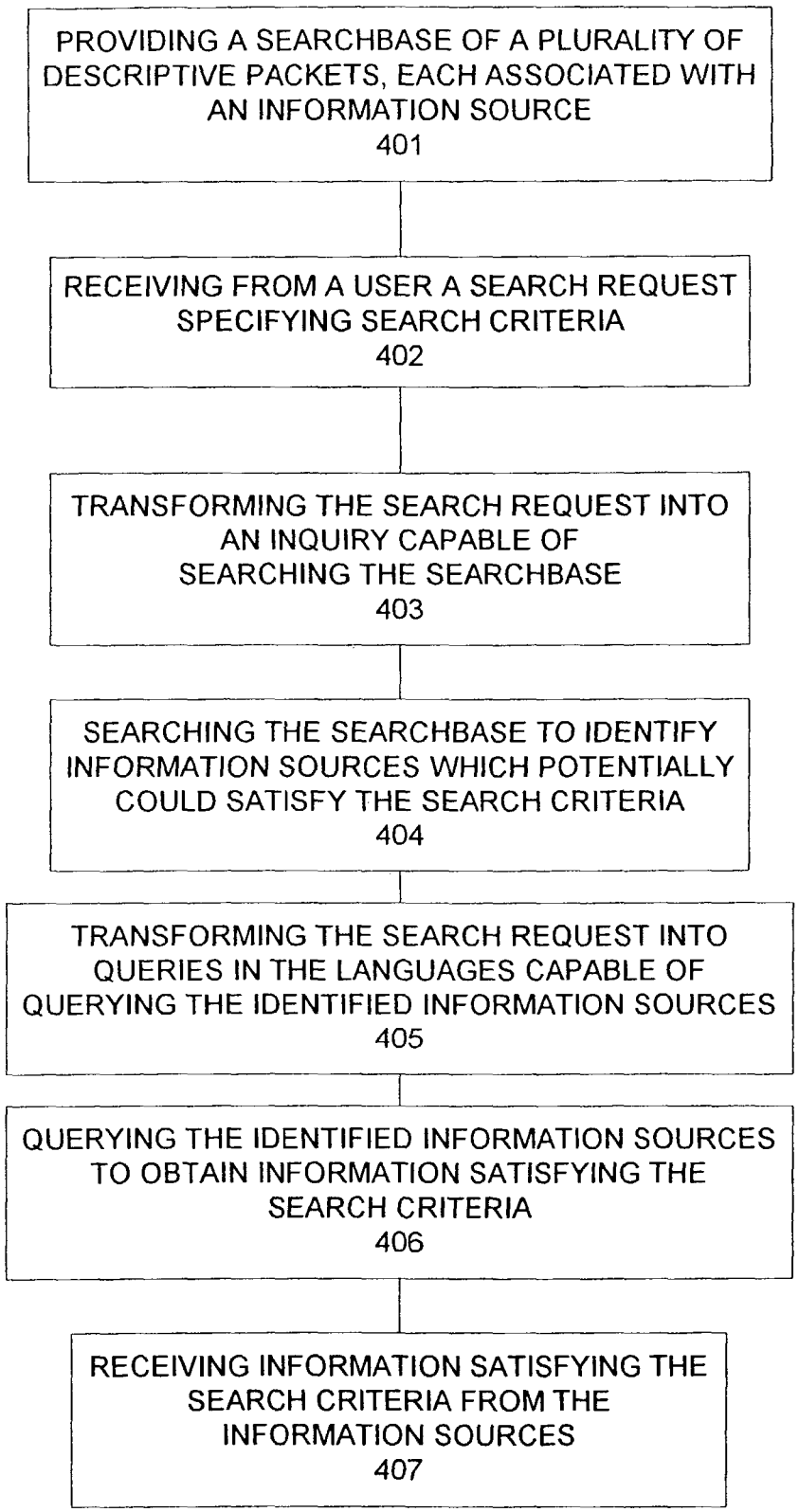
FIG. 4 is a flowchart of one method according to the present invention.

One method of searching for information on the computer information network 30 is illustrated in FIG. 4. In accordance with that method, in step 401, a searchbase of a plurality of descriptive packets is provided, each associated with an information source published on a computer information network 30. Each packet includes a query language and template usable therewith, a sending protocol usable therewith and a receiving protocol usable therewith.

In step 402, a search request is received from a user over the computer information network for retrieving information from a plurality of information sources in accordance with given search criteria. In step 403, the search request is transformed into an inquiry capable of searching the searchbase.

In step 404, the searchbase is searched with the inquiry to identify any of the plurality of information sources which potentially meet the given search criteria. In step 405, the search request is transformed into queries for the identified information sources, wherein each query is in accordance with the query language and the query template in the descriptive packet for the corresponding information source. The queries are sent over the computer information network to the identified information sources in step 406 in accordance with the sending protocol in the descriptive packet for the corresponding information source and information is received over the information network from the identified information sources in response to the queries in accordance with the receiving protocol in the descriptive packet for the corresponding information source in step 407.

In accordance with the invention, the information sources 11A-11N in FIG. 1 may comprise query forms, static pages, dynamically generated pages and other conventional information sources, such as databases.

The sending and receiving protocols may be different protocols or the same, depending upon the specific requirements of the information source.

Figure 5:
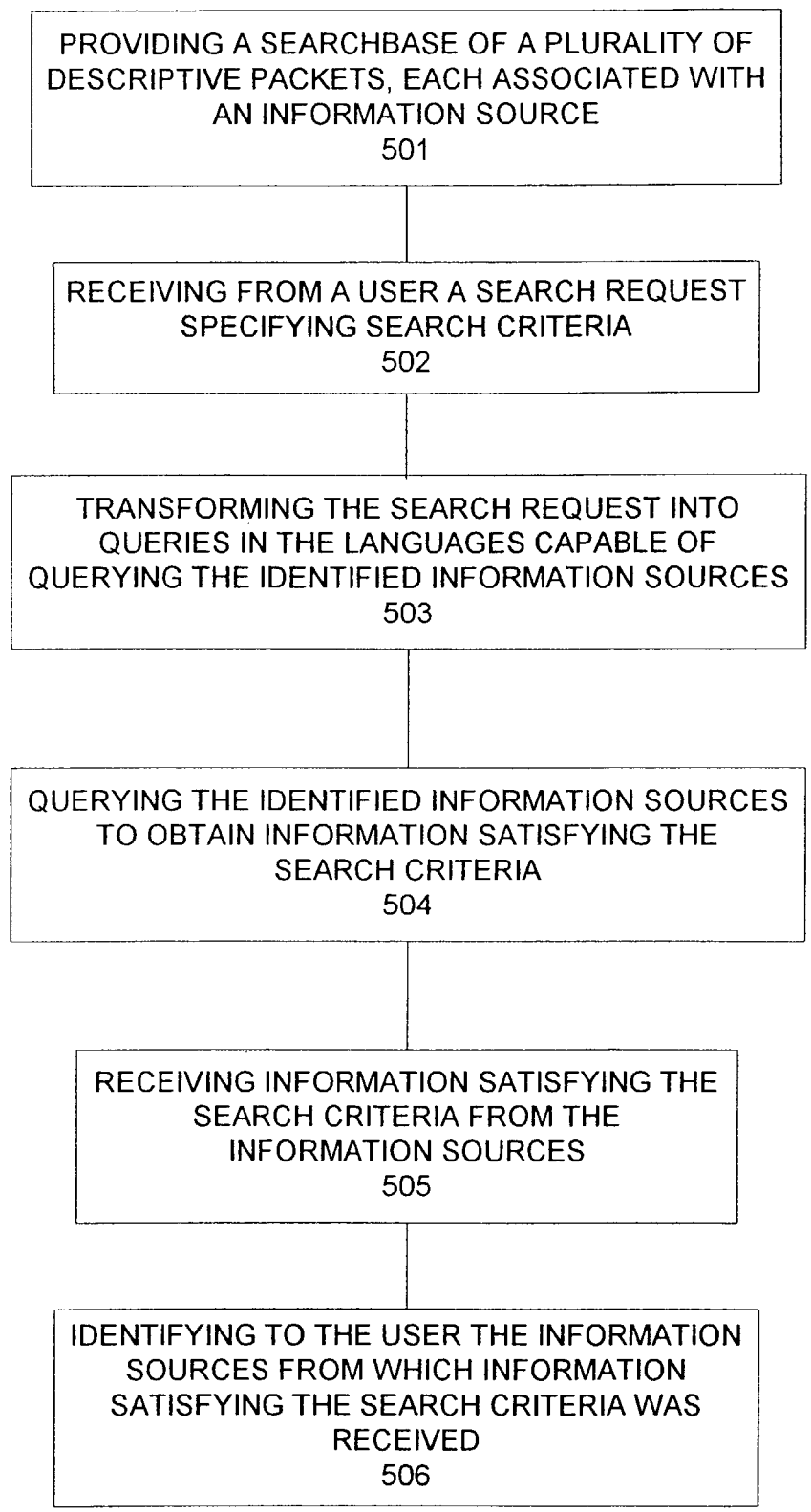
FIG. 5 is a flowchart of another method according to the present invention.

In another method of the present invention illustrated in FIG. 5, steps 501 and 502 are equivalent to those of steps 401 and 402 of FIG. 4. In step 503, the search request is transformed into a plurality of queries for the plurality of information sources. Each query is in accordance with the query language and query template in the descriptive packet for the corresponding information source. The plurality of queries are sent over the computer information network to the plurality of information sources in step 504 in accordance with the sending protocol in the descriptive packet for the corresponding information source. Information is received over the computer information network from the plurality of information sources in response to the queries in step 505 in accordance with the receiving protocol in the descriptive packet for the corresponding information source. Any information source from which information was received which meets the given search criteria is identified to the user in step 506.

As in the previously described method of FIG. 4, the information sources may comprise query forms, static pages, dynamically generated sources, etc. and the sending and receiving of protocols may be the same or different.

Figure 6:
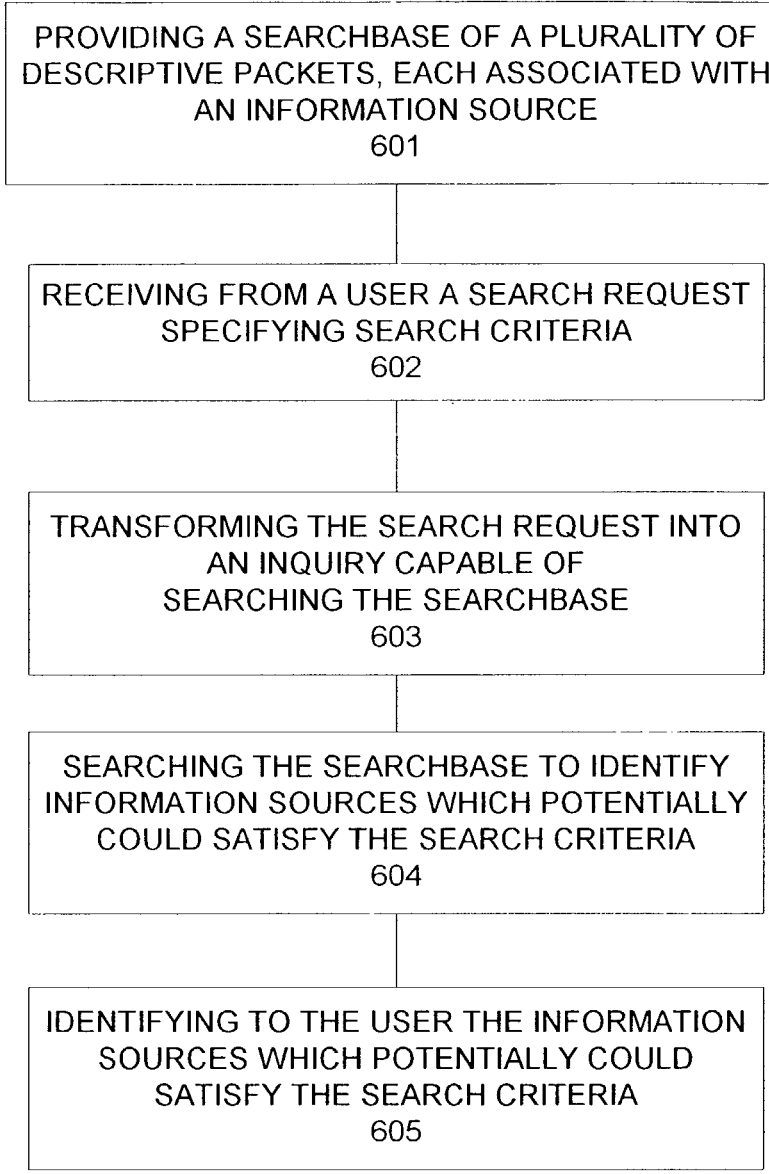
FIG. 6 is a flowchart of a further method according to the present invention.

In the method according to FIG. 6, in step 601, the searchbase is provided, however, in this instance, the descriptive packet includes an identification of the information source and a content description thereof, a query language and a template usable therewith, a sending protocol usable therewith, a receiving protocol usable therewith and a response language and parsing template usable therewith.

The step 602 is the same as the step 502 in FIG. 5 and after the search request is received from the user, it is transformed into an inquiry capable of searching the searchbase in step 603 as described with regard to step 403 in FIG. 4. The searchbase is then searched in step, 604 as described with regard to step 404, and in step 605, the identity of the identified information sources, which potentially could satisfy the search criteria, are identified to the user over the computer information network.

In accordance with the method of FIG. 6, in step 605, the identity of the information sources to the user may include at least a portion of the content description of the information source. As in the previous methods, the information sources may be query forms, static pages and dynamically generated information pages. Moreover, the sending protocol and the receiving protocol may be the same or different.

Figure 7:
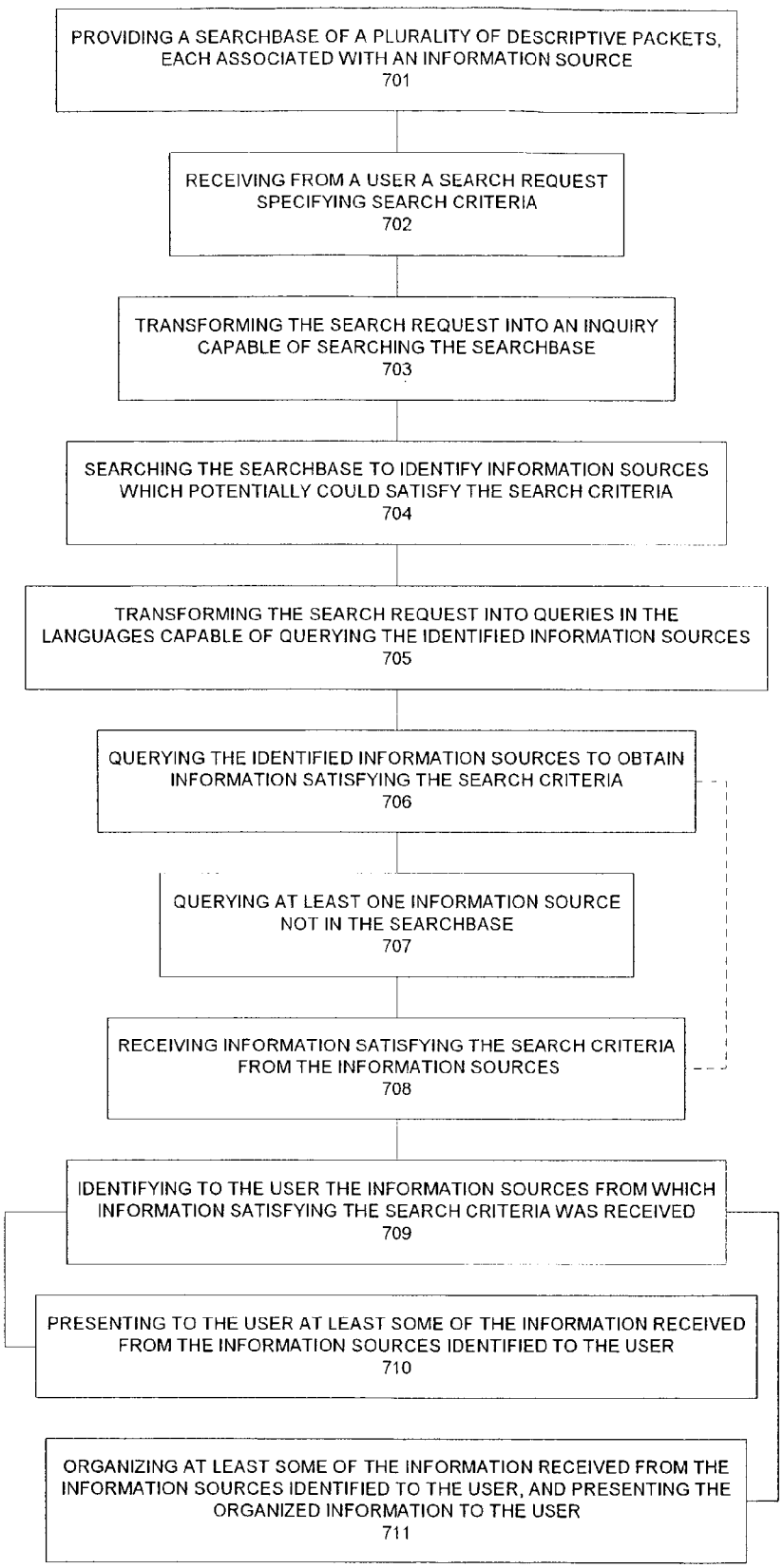
FIG. 7 is a flowchart of still another method according to the present invention.

The method according to FIG. 7 includes steps 701-704 which correspond to steps 601-604 and steps 705-706 which correspond to steps 405 and 406 of FIG. 4.

After the identified information sources are queried in step 706, the information satisfying the search criteria from the information sources may be received in step 708, or a query also may be sent to at least one additional information source not in the searchbase, as shown in step 707. All of the information received from the information sources in the searchbase and from those outside the searchbase are received in step 708 and the information sources from which information satisfying the search criteria was received is identified to the user in step 709. In alternative embodiments, at least some of the information received from the information sources identified to the user may be presented to the user in step 710, or at least some of the information received from the information sources identified to the user can be organized and presented to the user in their organized form in step 711.

With regard to the additional information source that is queried, the descriptive packet for that additional information source may be obtained after receipt of the search request by receiving information in accordance with a receiving protocol usable with the additional information source.

The information that is received from the information sources may include at least one database, text, graphics, audio, video, control signals, computer programs, or a combination thereof.

In step 701, the searchbase may be provided after the step of receiving a search request.

Figure 8:
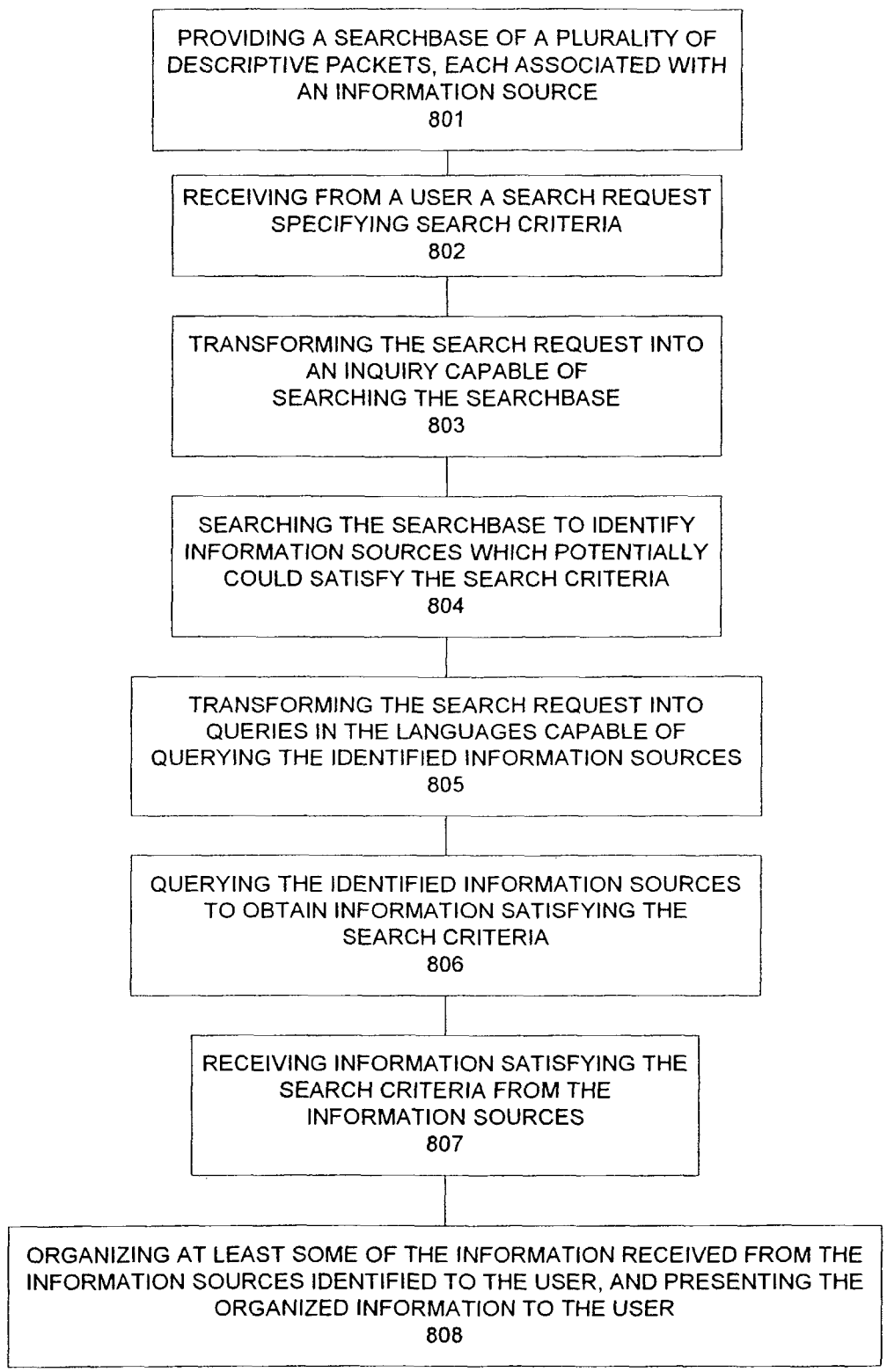
FIG. 8 is a flowchart of a still further method according to the present invention.

FIG. 8 shows another variant of the method according to the present invention wherein a searchbase is provided in step 801 with a plurality of descriptive packets, each associated with an information source. A user search request is received specifying search criteria in step 802, and the search request is transformed into an inquiry capable of searching the searchbase in step 803. The searchbase is searched to identify information sources which potentially could satisfy the search criteria in step 804, and the search request is transformed into queries in the languages capable of querying the identified information sources in step 805. The identified information sources are queried to obtain information satisfying the search criteria in step 806 and information satisfying the search criteria from the information sources is received in step 807. At least some of the information received from the information sources identified to the user is organized and presented to the user in an organized form. This organization is carried out in accordance with a response language and parsing template in the descriptive packet for the corresponding information source.

Figure 9:
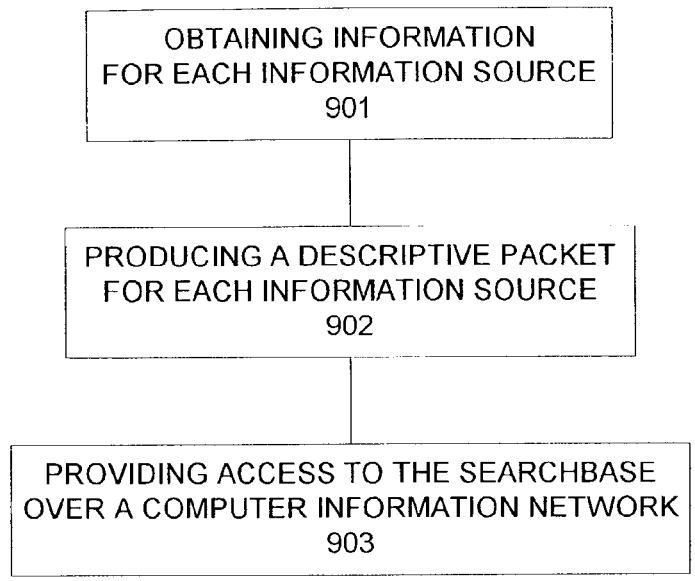
FIG. 9 is a flowchart of another method according to the present invention.

FIG. 9 illustrates a method for creating a searchbase in accordance with the invention. As shown in FIG. 9, information is obtained for each information source in step 901, including an identification of the information source and a content description thereof, a query language and template usable therewith, a sending protocol usable therewith and a receiving protocol usable therewith. A descriptive packet is produced for each information source from the obtained information in step 902 and access to the searchbase over the computer information network 30 is provided to users in step 903.

Information may be obtained from each information source in a variety of ways, as shown, for example, in FIGS. 9A-9D.

Figure 9A:
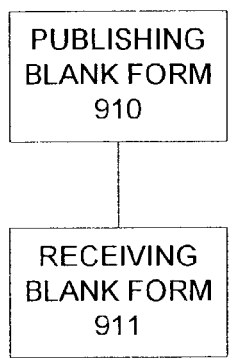
FIGS. 9A-9D are flowcharts of alternative methods of obtaining information according to the embodiment of FIG. 9.

In FIG. 9A, the central authority may publish a blank form (such as the one shown in FIGS. 12A through 12C) in step 910 and receive completed forms from information sources in step 911. The publication of forms may be made on the Internet, by electronic transmission (e.g., radio broadcast), or in print media.

Figure 9B:
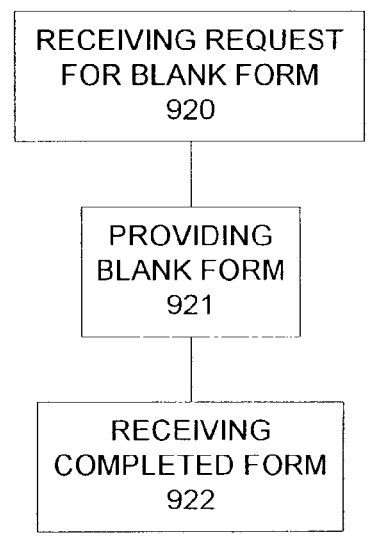

In FIG. 9B, the information is obtained by first receiving a request for a blank form from an information source in step 920, providing the blank form in step 921, and receiving the completed form in step 922. The request for the form may be made over the Internet, by electronic transmission, or in hard copy.

Figure 9C:
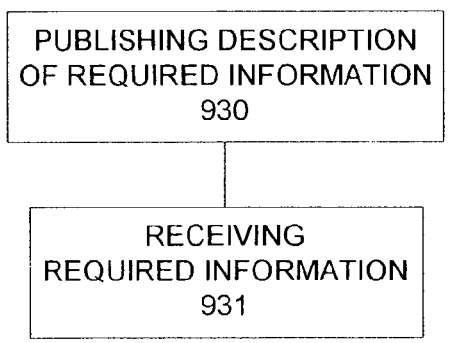

In FIG. 9C, the central authority publishes a description of the information required for the descriptive packet in step 930, and receives the information from which a descriptive packet may be produced in step 931. The publication of the description may be made on the Internet, by electronic publication (e.g., radio broadcast), or in print media.

Figure 9D:
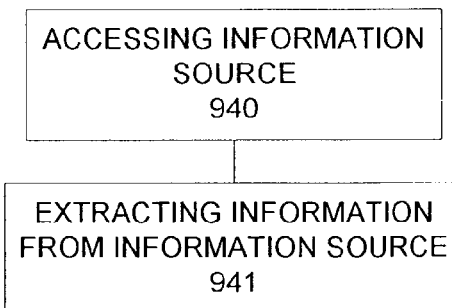

Alternatively, as shown in FIG. 9D, the central authority may access the information source itself in step 940, and automatically extract information from it. The accessing of the information source may be done manually or by automated means such as a "spider" program which either randomly seeks out information sources, or is directed to specific information sources, by the central authority or by another entity.

The forms and information received may be received over the Internet, electronically, or in hard copy, including by e-mail and FTP transfer.

The receiving of the information may be accomplished in accordance with a receiving protocol usable with the information source. The information that is extracted from the information sources can be a portion of the required information for the descriptive packet, and it may be obtained from at least one of the meta-tags in the accessed information source and the references obtainable from the accessed information source.

Figure 10:
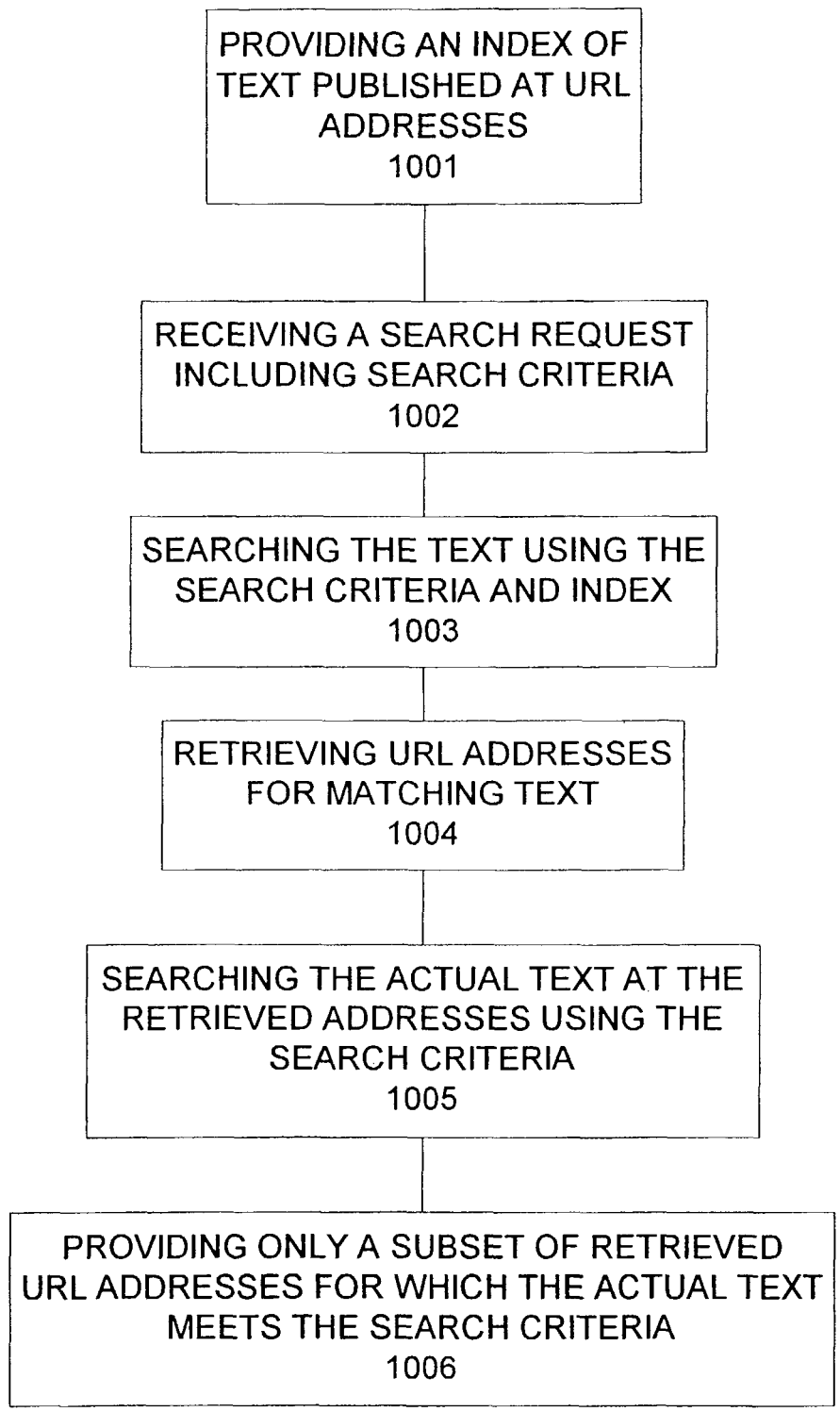
FIG. 10 is a flowchart of still another method according to the present invention.

FIG. 10 illustrates a further embodiment of the method for searching over the Internet in accordance with the present invention. In step 1001, an index of text published at URL addresses is provided. A search request, including search criteria, is received in step 1002, and the text is searched using the search criteria and index in step 1003.

URL addresses for matching text are retrieved in step 1004. However, instead of merely providing the identity of the retrieved URL addresses to the user, a second search of the actual text at the retrieved addresses using the search criteria is carried out in step 1005. Thereafter, only a subset of retrieved URL addresses for which the actual text meets the search criteria is provided to the user in step 1006.

In this way, the user does not receive as search responses URL addresses of Web pages which do not currently meet the search criteria; e.g., addresses of pages that no longer exist and addresses of pages which have been changed after being indexed such that they no longer meet the search criteria.

An example of how the methods of the present invention are implemented will now be explained. For purposes of this example we will describe the domain of shoes. This is intended to be illustrative rather than complete.

The example consists of a set of three information sources associated with vendors of shoes, each having five products, and in which the taxonomic structure of categories is based on the tree structure of general/specific relationships, and is shown in FIG. 11A. The database of categories has been made extremely small in order to make the example more easily understood.

In this example, each category entry from the three information sources (explained later with reference to FIGS. 12A through 12C) associates that information source in the searchbase only with that specific category entry, as shown in FIG. 3A. With such a structure, a user's search request is used to search not only the specific category in the searchbase determined by parsing the user's search request, but also all categories which are either entirely more general or entirely more specific. Thus, a user's request to search athletic shoes will result in the information sources being queried with respect to the following categories: apparel-shoe-athletic (the requested category); apparel and apparel-shoe (both entirely more general); and apparel-shoe-athletic-hiking, apparel-shoe-athletic-riding, apparel-shoe-athletic-running, and apparel-shoe-athletic-tennis (all entirely more specific). But no query will be made with respect to the category of "work shoes" (apparel-shoe-work), because this category is neither entirely more general nor entirely more specific than "athletic shoes" (apparel-shoe-athletic).

The searchbase could, or course, be constructed in the inverse manner, namely, wherein the information sources are associated not only with the specific categories specified by the information source, but also with all categories which are either entirely more general or entirely more specific. With such a structure, the user's search request would be used to search only the specific category requested by the user. FIG. 3B is a schematic representation of such a searchbase structure.

The three vendors are referred to as Alpha, Beta, and Gamma. The products contained in the databases of the three information sources is shown in FIG. 11B. In this example, each vendor provides a query form for the use of its customers over the Web, although each vendor's query form is different from the other two vendors' query forms.

In order to permit users to access its most current database of shoes, the vendor must submit to the searchbase the search methodology which the vendor uses to allow its database to be queried. In this example, that means the vendor must provide the information necessary to enter a query into its query form and to understand the response obtained from the query. The vendor submits only the methodology; the vendor does not submit the database itself.

When a search request is made by a user, the methodology is used to search the vendor's database in the same manner that the search would be conducted were the user submitting the search request from the vendor's own Web query form. For example, if the vendor's query form allows as input just the title or model of a book, record, drug, automobile, or any other product, or permits Boolean operators, phrases, or other types of search criteria to be input, then the method of the present invention will allow the same searches to be conducted.

Thus, although the vendor alone retains control over its database, and the user need not even know of the existence of the vendor, the user is able to search the most current version of the vendor's database by making a search request through the searchbase.

FIGS. 12A-12C illustrate an example of a form published on the Internet for obtaining the information from the provider of an information source which would be used to create the descriptive packet in the searchbase for the information source.

Referring now to FIGS. 12A-12C, the form in FIG. 12A includes a location 1201 for the name, company, address, phone, fax, and e-mail associated with the information source. In section 1202, the ability is provided to select whether every query should be sent to the information source, or whether only certain queries should be sent. Section 1203 of the form allows the indication of the broadest categories (other than "all") for which queries should be sent to the information source, or the selection of more categories at the same taxonomic level, or the selection of the choice of sub-menus which then brings up FIGS. 12B and 12C as will be described hereinafter.

Section 1204 allows the indication of the language used to query the information source, section 1205 the indication of the template for the query language, 1206 the indication of the protocol for sending to the information source, section 1207 the indication of the protocol used for receiving information from the information source, section 1208 the indication of the language used by the information source to respond and section 1209 the indication of the template of the response language used by the information source.

If one selects the sub-menus in section 1203 for apparel, for example, the form of FIG. 12B will appear with section 1211 to allow one to specify a specific type of apparel for which queries should be sent to the information source. The form of FIG. 12B also has links for more categories at the same taxonomic level, and sub-menus, and if one selects, for example, shoes, one will obtain a form such as that shown in FIG. 12C wherein section 1212 has specific sub-categories of shoes, and options to select more categories at the same taxonomic level, and sub-menus.

In this example, assume the following information concerning Alpha:

Alpha provides a Web page with a query form on it (not shown). Its Web page is located at http://www.Alpha.com, and the page is written in HTML. It uses HTTP to both receive and send information. Alpha's query form allows for searching for shoes by any of type ("type"), color ("color"), and maximum price ("price").

When a user enters information in some of those three fields of Alpha's query form, and submits the form, the user's browser generates a URL incorporating that information in accordance with the HTML code written by Alpha, and sends the URL to Alpha's server so that Alpha's database may be searched using that information as search criteria. In this example, assume the URL generated has the following template:

"http://www.Alpha.com/bin/
getproduct?type=<aaa>&color=<bbb>&
price=<ccc>", where "aaa" represents the type entered by the user in the search form, "bbb" represents the color entered by the user in the search form, and "ccc" represents the maximum price entered by the user in the search form. (Thus, in this example, a user submitting Alpha's query form with "boots" as the type, "black" as the color, and "$90" as the maximum price would generate the following URL: "http://www.Alpha.com/bin/getproduct?type=boots&color=black&price=90".

When the generated URL is accessed on Alpha's server, the server accesses Alpha's database and returns information structured in, for example, GREP. The returned information, in this example, has the following template: "SKU:\t{A-Z}*\nType:\t{A-Z}*\nColor:\t{A-Z\}*\nPrice:\t${0-9}*\n", (which, in accordance with the GREP language, will result in a single 4-column structured representation of the retrieved data).

In order for Alpha's database to be accessible through the searchbase, Alpha must provide the searchbase with the appropriate information about its information source, which is its query form. In this example, this information includes the identification of Alpha and its query form, the categories about which Alpha desires to be queried, the language used by Alpha's query form, the template of a submission made by Alpha's query form to its database, the protocol for sending to Alpha, the protocol for receiving from Alpha, the language used by Alpha in returning its results, and the template of the returned information.

Alpha may provide this information by filling out the blank form shown in FIGS. 12A-12C. FIG. 13 shows the form of FIG. 12A filled out to reflect the information concerning Alpha stated above.

Beta uses a different language for both queries and responses—a program with SQL calls on a remote database containing its information. The example assumes the program language is C, but any programming language with embedded SQL can be used. These could also be variants of the API (application programming interface) versions of SQL, such as ODBC, JDBC, etc.

The example program is GetProduct with parameters (shoe_type, price_range, color) that are to be extracted from the user's search request. The program outputs a set of text lines containing the components desired (e.g., description, price, color).

The access method calls the executable program derived from the source of GetProduct (or interpret the source directly) with parameters derived from the search request. The source code of the GetProduct program is contained in the Appendix. This program dynamically creates the SQL query and then calls the remote database with it. It then transmits all results to the standard output.

The response is in a standard format called "comma-separated-value" file (CSV) or "comma-delimited-file" structure. That is, each line has fields separated by commas. In this example, the fields are product identification, description, color, and price. An example output line is:

"B0003, formal shoe for men", "men's formal", black, 95.00

The response-parse method consists of an indicator that this is a CSV file, and that the fields contained in each line are (product_id, description, price, color). A standard language processor will then extract the components of each result.

FIGS. 14A-14B show the forms of FIGS. 12A-12B as finally filled out by Beta to reflect the information concerning Beta stated above.

FIGS. 15A-15C shows the forms of FIGS. 12A-12C as finally filled out by Gamma to reflect Gamma's information (not described above).

The blank form of FIG. 12A also permits the provider of the information source to ask to be notified at a later time to submit the required information by checking the box in section 1210. To do this, the provider must provide the identification of the information source, a language in which to request the required information, and the protocols needed to send the request to, and received an answer from, the information source. If the foregoing information is submitted, it is possible for the central authority to request the information from the information source as to how to query the information source after the central authority receives a user's search request. In such a situation, after the central authority receives the user's search request, it requests of the information source, using the information previously supplied to the central authority with respect to the information source, that it provide the central authority with the information by which a query can be made of the information source. Once this information is returned to the central authority, a query is made of the information source in the same manner as it would have been made had the information been provided before the user's search request was received by the central authority.

FIG. 16 shows the form of FIG. 12A filled out by Delta to request that Delta's information source be queried at a later time to submit its query methodology. The query information returned by Delta's information source when asked for it may utilize different languages and protocols from those initially submitted to the central authority.

FIG. 17 illustrates an example of instructions for a user to fill in the blanks of the form of FIG. 12A.

The following are three specific examples intended to show how specific queries are processed in accordance with the present invention and the example vendors, categories and searchbase described above. In these examples the searchbase is organized in accordance with the methodology of FIG. 3A.

Example Search Request #1: "Locate Size 8 Men's Dress Shoes in Black"

1. The search request is parsed to extract the following items:
   categories:   apparel-shoe-men;   apparel-shoe-dress;
      apparel-shoe-formal-dress
   attributes: size=8; color=black 2. An inquiry of the searchbase is made on the following categories: apparel; apparel-shoe; apparel-shoe-men; apparel-shoe-dress; apparel-shoe-formal; apparel-shoe-formal-dress 3. The inquiry of the searchbase returns Alpha and Beta as vendors: Alpha is associated with apparel; Beta is associated with apparel-shoe.

4. Queries are formulated in the languages appropriate to Alpha and Beta, and sent to them in accordance with the protocols appropriate for sending to them. These queries are:
   for Alpha (delineated by "[ ]") [http://www.Alpha.com/
      bin/getproduct?attributes="men,dress,
      size=8"&color=black].
   for Beta: execute on the central authority's system the program compiled from the vendor's information packet, with these parameters (delineated by "[ ]"): ["men,dress,size=8"," ","black"].

5. Alpha searches its database, finds two items which are men's dress shoes (items #2-3 in FIG. 11B), one of which is black with no size designation, and the other of which is brown. Alpha returns the one matching item: A0002

Beta has three items which might be men's dress shoes (items #6-8 in FIG. 11B), but only two in black (#6 & #8), and only 1 of these in size 8. Beta returns the one matching item: B0003

6. The results from each vendor are analyzed in accordance with the response language and parsing template associated with that vendor, the components from all responses are combined, and the central authority determines the presentation for display, for example:

Response to search request: "Locate size 8 men's dress shoes in black"
The vendors below have the following matches to your search request. Click on the vendor's name or product hyperlink for more information.

| Vendor | Description |
| --- | --- |
| Alpha | A0002: wonderful dress show in black |
| Beta | B0003: formal shoe for men |

Example Search Request #2: "Where can I buy Nike Running Shoes?"

1. The search request is parsed to extract the following items:

| categories: | apparel-shoe-Nike; |
| --- | --- |
|  | apparel-shoe-athletic-running |
| attributes: | none |

2. An inquiry of the searchbase is made on the following categories: apparel; apparel-shoe; apparel-shoe-Nike; apparel-shoe-athletic; apparel-shoe-athletic-running 3. The inquiry of the searchbase returns all three vendors: Alpha is associated with apparel; Beta is associated with apparel-shoe; Gamma is associated with apparel-shoe-running.

4. Queries are sent to all three vendors; e.g., the query for Alpha (delineated by "[ ]") is: [http://www.Alpha.com/bin/getproduct?attributes="running-shoe,Nike"].

5. Alpha and Beta do not have any running shoes. Gamma returns: C0002

6. The results are displayed, for example:

Response to search request: "Where can I buy Nike running shoes?"
The vendor below has the following match to your search request. Click on the vendor's name or product hyperlink for more information.

| Vendor | Description |
| --- | --- |
| Gamma | C0002: Nike running shoe |

Example Search Request #3: "Who Sells Elevator Shoes?"

1. The search request is parsed to extract the following items:

| category: | apparel-shoe-elevator |
| --- | --- |
| attributes: | none |

2. An inquiry of the searchbase is made on the following categories: apparel; apparel-shoe; apparel-shoe-elevator 3. The inquiry of the searchbase returns Alpha and Beta as vendors: Alpha is associated with apparel; Beta is associated with apparel-shoe.

4. Queries are sent to Alpha and Beta.

5. Alpha and Beta do not have any elevator shoes.

6. The results are displayed, for example:

> Response to search request: "Who sells elevator shoes?"
> No vendor has indicated that it sells elevator shoes.
> SORRY!

Those of skill in the art will understand that various changes can be made to the methods and systems described herein without departing from the scope of the invention. For example, one or more of the steps of the methods as described can be performed by one or more authors, providers, and/or publishers of, or agents for, or parties associated with, an information source and/or the searchbase. Similarly, one or more of the steps of the methods as described can be performed by the user or agents for the user (including so-called "software" or "program" agents), or by network access providers such as Internet service providers, or by intermediary parties such as application service providers and the operators of search engines, Web portals, and Web sites.

Descriptive packets may be supplied by one or more third parties who provide the packets to one or more searchbases which are made available through one or more locations on the Internet, etc. Descriptive packets or parts of descriptive packets may be stored in the form of cookies for automated or manual retrieval by the central authority. Descriptive packets may be obtained by the central authority scanning in the appropriate information from lists published in hard copy in newspapers, magazines, or publications mailed or otherwise sent in to the central authority. While FIG. 12 shows a form for use with one information source and one associated access description, the information required for any number of descriptive packets with the same access descriptions may be submitted together, for example, by means of a different form. Hereinabove it is stated how the central authority may query an information source as to how to query its database after the central authority receives a search request. Similarly, an information source may submit a descriptive packet of a type which if queried will result in more specific information about the information source and therefore result in a more efficient indexing of that information source. An example of information sources of the type just referred to are so-called "bomblets" which consist of a multitude of identical sensors dropped from an airplane which all measure the same type of information (e.g., temperature), but which differ only in their physical location which the sensors are able to determine after they land. A query of each of these otherwise identical information sources before a user's search request is received would enable the searchbase to categorize them with respect to their location, thereby lessening the computational burden when a user's search request is received.

The user may interact with one or more intermediary third parties (e.g., search engines or Web sites) who will submit the search criteria to the searchbase and receive information therefrom for presentation to the user in additional steps.

One or more searchbases may be created and/or provided by third parties for one or more central authorities to perform the searches thereon, and a central authority may create and/or provide one or more searchbases for one or more third parties to allow such third parties to offer to the users of the third parties' services the ability to query one or more of such searchbases.

While FIG. 12 shows only the subject matter of the information source, it is understood that additional information about the information source could be submitted to the searchbase to allow specific categories of searches to be conducted. Such limitations could be, for example, related to the language(s) in which the database of the information source is provided, the country of origin of the information source or of its database, the location of one or more of the authors, providers, and/or publishers of the information source or its database, the date of the information in the information source's database, or some characteristic of the information source. For example, an information source could indicate that it was associated with: a buyer, a seller, an individual, an organization, an information provider, an information receiver, an affinity group, a discussion forum, a product reviewer, a commercial organization, a non-profit organization, a charitable organization, an educational organization, a governmental organization, etc.

It is understood that the physical embodiments of the information sources which are the subject matter of the present invention are not limited to those set forth in the examples. Information sources include not only conventional web pages, but include automated reporting stations (e.g., weather, traffic, skiing-condition reporters), automated data stations (e.g., atmospheric, air, water, soil data reporters), automated sensor stations (e.g., household appliances, vehicles, office equipment sensors), and autonomous web servers. These automated information sources may provide not only the raw data which they measure, but also information resulting from the analysis of that data, and descriptive data about themselves, such as their own location, age, and measurement tools capabilities.

As one further example of the scope of the present invention, the computer networks involved may include wired and wireless networks, fixed and mobile network elements, continuous and intermittent connections among the elements, and transmission among the elements by radio, microwave, infrared, and optical means.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

APPENDIX

```c
#include <stdio.h>
/* Parameters for this program are to be provided in the execution
environment in standard fashion.  They are:
      type of shoe
      maximum price
      color
*/
/* User and password must be defined in order to connect.  */
#define USER       "merchant's internal user name for database login"
#define PASSWORD   "merchant's internal password for database login"

/* Exit codes: STDEXIT means there was no error, ERREXIT means there
was.  */
#define ERREXIT -1
#define STDEXIT  0

/* Declare the SQLCA object.  */
EXEC SQL INCLUDE SQLCA;

/* Declare section for global defines or variables.*/
EXEC SQL BEGIN DECLARE SECTION;
EXEC SQL END DECLARE SECTION;

/* Forward declaration for error handling functions.  */
void error_handler();
void warning_handler();

/* the following program is run when we call the GetProduct executable
*/
main(argc,argv)
     int argc;
     char *argv[argc];
{
  /* Declare local variables here: */
  char temp[255];
  char shoe_type[128], char price_range[128], char color[128];

EXEC SQL BEGIN DECLARE SECTION;
  /* storage for login name and password.  */
  char      username[30];
  char      password[30];
  CS_CHAR   select_string[2048];
  CS_CHAR product_id[128];
  CS_CHAR description[128];
  CS_CHAR color[128];
  CS_CHAR price[128];
  /* Indicator variables are declared as shorts.  */
```

```
short i_pid;
short i_description;
short i_price;
short i_color;
EXEC SQL END DECLARE SECTION;

/* Get the input parameters into the correct variables. */
if(argc > 1) {
  strcpy(shoe_type,argv[1]);
  strcpy(price_range,argv[2]);
  strcpy(color,argv[3]);
}
else {
  fprintf(stdout, "\n** Required input parameters missing\n");
  exit(ERREXIT);
}

/* Rather than code in a test for errors after each SQL statement,
   these statements do that automatically, and call a function
   if there is an error. */
EXEC SQL WHENEVER SQLERROR CALL error_handler();
EXEC SQL WHENEVER SQLWARNING CALL warning_handler();
EXEC SQL WHENEVER NOT FOUND CONTINUE;
/* Put the username and password into SQL declared variables. */
strcpy(username, USER);
strcpy(password, PASSWORD);

/* Connect to the default server (defined by the DSQUERY
   environment variable). */
EXEC SQL CONNECT :username IDENTIFIED BY :password;

/* Choose which database to use. */
EXEC SQL USE merchant_main;

/* Prepare the SQL Select statement and declare a cursor for it. */
strcpy(select_string,"select PRODUCT_ID,DESCRIPTION,COLOR,PRICE from products where ");

sprintf(temp,"SHOE_TYPE = >%s= and ", shoe_type);
strcat(select_string, temp);
sprintf(temp,"PRICE_RANGE = >%s= and ", price_range);
strcat(select_string, temp);
sprintf(temp,"COLOR = >%s=", color);
strcat(select_string, temp);

EXEC SQL PREPARE select_st FROM :select_string;
EXEC SQL DECLARE SELECT_CURSOR CURSOR FOR select_st;

/* Open the cursor; supply any variables needed. */
EXEC SQL OPEN SELECT_CURSOR;
```

```
  /* Fetch one row at a time.  */
  for(;;) {
    /* This line fetches the next row.  */
    EXEC SQL FETCH SELECT_CURSOR INTO :product_id :i_pid, :description
:i_description, :color :i_color, :price :i_price;

/* sqlcode 100 means there are no more rows to fetch.  */
    if (sqlca.sqlcode == 100) break;

/* Print the results on a line as product id, description, color,
price */
    printf("%s,=%s=,%s,%s\n", product_id, description, color, price);
  }

/* Close the cursor.  */
  EXEC SQL CLOSE SELECT_CURSOR;

/* Disconnect from all open connections.  */
  EXEC SQL DISCONNECT ALL;
  /* Exit with standard exit code.  */
  exit (STDEXIT);
}

/* Displays error codes and exits with an ERREXIT status.  */
void error_handler()
{
  fprintf(stdout, "\n** SQLCODE=(%d)", sqlca.sqlcode);
  if (sqlca.sqlerrm.sqlerrml)
  {
    fprintf(stdout, "\n** SQL Server Error ");
    fprintf(stdout, "\n** %s", sqlca.sqlerrm.sqlerrmc);
  }
  fprintf(stdout, "\n\n");
  exit(ERREXIT);
}

/* Displays warning messages.*/
void warning_handler()
{
  if (sqlca.sqlwarn[1] == 'W')
    fprintf(stdout, "\n** SQLWARN Data truncated.\n");
  if (sqlca.sqlwarn[3] == 'W')
    fprintf(stdout, "\n** SQLWARN Insufficient host variables to store
results.\n");
  return;
}
```

What is claimed is:

1. A method for searching for items via the Internet, comprising:
   creating, by a system including a processor, an index of items, the items being available via the Internet at information sources, wherein the index of items comprises a plurality of descriptive packets, each of the plurality of descriptive packets comprising:
      an information source search language;
      an information source search template;
      an information source protocol; and
      information source product hierarchy information in which the items are arranged in a hierarchy according to categories and sub-categories of the items at a respective information source;
   receiving, by the system, a request to search for a product via the Internet, the request to search including search criteria received with the request, the search criteria being received from an end user device based on user input;
   transforming, by the system, the request to search into an inquiry suitable to the index of items based on the plurality of descriptive packets;
   searching, by the system, the index of items using the inquiry to produce a first set of information sources corresponding to a first subset of items related to the inquiry according to the product hierarchy information;
   accessing, by the system, search methodologies that are associated with the first set of information sources
   generating, by the system, a modified inquiry for each of the first set of information sources, wherein the modified inquiry is translated according to the information source search language and the information source search template;
   searching, by the system, each of the first set of information sources according to the modified inquiry for the first subset of items of the first set of information sources via an information source protocol of the first set of information sources and according to the information source product hierarchy information of the information source that match the modified inquiry for each of the first set of information sources; and
   responding to the request to search for items by providing results from each of the first set of information sources related to the first subset of items.

2. The method according to claim 1, wherein the searching of the first subset of items comprises applying the modified inquiry to items at fewer than all of the information sources.

3. The method according to claim 1, wherein the searching of the first subset of items comprises applying the modified inquiry to items at all of the first set of information sources.

4. The method according to claim 1, wherein the searching the index of items produces a second set of information sources corresponding to a second subset of items related to the inquiry according to the product hierarchy information.

5. The method according to claim 4, further comprising:
   accessing, by the system, search methodologies that are associated with the second set of information sources
   generating, by the system, a modified inquiry for each of the second set of information sources, wherein the modified inquiry is translated according to the information source search language and the information source search template; and
   searching, by the system, each of the second set of information sources according to the modified inquiry for the second subset of items of the second set of information sources via an information source protocol of the second set of information sources and according to the information source product hierarchy information of the second set of information sources that match the second subset of items.

6. The method according to claim 5, wherein the responding to the request to search further comprises providing results from each of the second set of information sources related to the second subset of items.

7. The method according to claim 5, wherein the responding to the request to search comprises providing only uniform resource locator addresses in the second set of information sources.

8. The method according to claim 5, wherein the responding to the request to search comprises providing less than all of search results from the second set of information sources.

9. The method according to claim 5, wherein the responding to the request to search comprises providing results from all of the first set of information sources and the second set of information sources.

10. The method according to claim 5, wherein the responding to the request to search comprises providing only uniform resource locator addresses in the first set of information sources and the second set of information sources.

11. The method according to claim 1, wherein the responding to the request to search comprises providing all of the information sources.

12. The method according to claim 1, wherein the responding to the request to search comprises providing only a uniform resource locator addresses of search results from the first set of information sources.

13. The method according to claim 1, wherein the creating of the index further comprises:
   receiving first descriptive information from information sources, wherein the first descriptive information describes the items available at the information sources; and
   obtaining second descriptive information describing the items available at the information sources, wherein the second descriptive information includes sub-categories of the product hierarchy information.

* * * * *